(12) United States Patent
Ishibashi et al.

(10) Patent No.: US 8,740,470 B2
(45) Date of Patent: Jun. 3, 2014

(54) RETAINER FOR RADIAL ROLLER BEARING

(75) Inventors: Yutaka Ishibashi, Gunma (JP); Makoto Watanabe, Gunma (JP); Tetsuya Takahashi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/392,975

(22) PCT Filed: Sep. 13, 2011

(86) PCT No.: PCT/JP2011/070873
§ 371 (c)(1),
(2), (4) Date: Jun. 4, 2012

(87) PCT Pub. No.: WO2012/036159
PCT Pub. Date: Mar. 22, 2012

(65) Prior Publication Data
US 2013/0266249 A1 Oct. 10, 2013

(30) Foreign Application Priority Data

Sep. 15, 2010 (JP) ................................. 2010-206331
Aug. 8, 2011 (JP) ................................. 2011-172596

(51) Int. Cl.
*F16C 33/48* (2006.01)

(52) U.S. Cl.
USPC ........................................................ 384/572

(58) Field of Classification Search
USPC ......... 384/462, 470, 523, 526, 560, 572, 578, 384/579, 614, 621, 623
See application file for complete search history.

(56) References Cited

U.S. PATENT DOCUMENTS

| | | | | |
|---|---|---|---|---|
| 4,235,487 A | * | 11/1980 | Schard | 384/576 |
| 5,033,876 A | * | 7/1991 | Kraus | 384/572 |
| 5,184,899 A | * | 2/1993 | Harimoto | 384/560 |
| 6,371,655 B1 | * | 4/2002 | Fierling | 384/523 |
| 6,742,934 B2 | * | 6/2004 | Matsuyama et al. | 384/572 |
| 2011/0069918 A1 | * | 3/2011 | Wakuda et al. | 384/482 |

FOREIGN PATENT DOCUMENTS

| | | |
|---|---|---|
| DE | 42 22 175 A1 | 1/1994 |
| JP | 5-3642 U | 1/1993 |
| JP | 5-3643 U | 1/1993 |
| JP | 2007-78090 A | 3/2007 |
| JP | 2008-8333 A | 1/2008 |
| JP | 2009-156393 A | 7/2009 |
| JP | 2009-228682 A | 10/2009 |
| WO | WO94/01691 * | 1/1994 |

OTHER PUBLICATIONS

Translation of JP2007-78090 obtained Aug. 19, 2013.*
International Search Report (PCT/ISA/210) dated Nov. 29, 2011, issued in International Application No. PCT/JP2011/070873.

* cited by examiner

*Primary Examiner* — James Pilkington
(74) *Attorney, Agent, or Firm* — Sughrue Mion, PLLC

(57) ABSTRACT

A pair of rim portions (4a) and (4b) is formed in the shape of a discontinuous segmental circular ring, which includes cutout portions (8a) and (8b), respectively, at one position. The cutout portions of the respective rim portions are concentrically disposed so as to face each other with a predetermined interval therebetween in an axial direction while having the same phase in a circumferential direction. A plurality of pillar portions (6) form pockets (10) where rollers (14) are retained. An expandable elastic connecting portion (12), which connects one end portion (84a) of one rim portion in the circumferential direction to the other end portion (82b) of the other rim portion in the circumferential direction, is provided at the pair of rim portions.

2 Claims, 14 Drawing Sheets

FIG. 7A
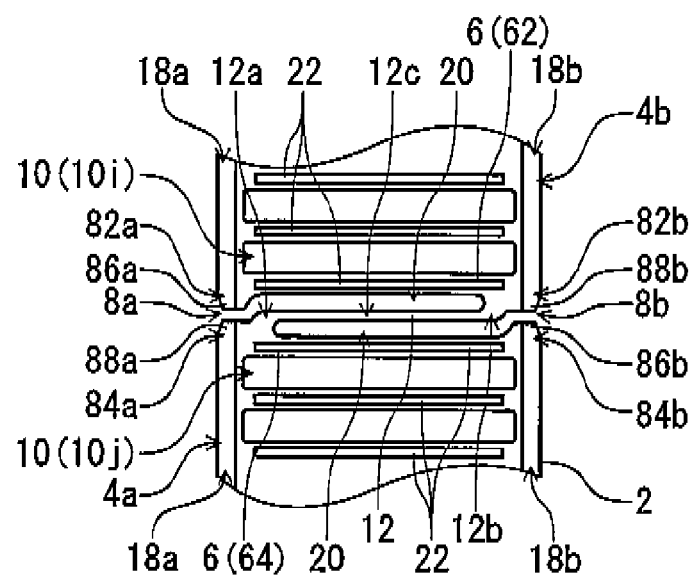
FIG. 7B
FIG. 7C
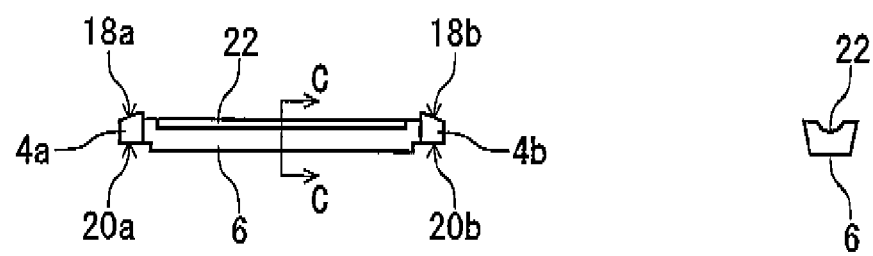

RETAINER FOR RADIAL ROLLER BEARING

CROSS-REFERENCE TO RELATED PATENT APPLICATIONS

This application is based upon Japanese Patent Application (Japanese Patent Application No. 2010-206331) filed on Sep. 15, 2010 and Japanese Patent Application (Japanese Patent Application No. 2011-172596) filed on Aug. 8, 2011, the contents of which are incorporated herein by reference.

BACKGROUND

1. Field of the Invention

The present invention relates to a retainer used in a radial roller bearing that supports a rotating system to which a large radial load (a load in a radial direction) is applied like a power mechanism that is provided in a vehicle such as an automobile or a railroad car. Specifically, the invention relates to the improvement of a one-split resin retainer with a spring that is assembled with a needle (needle roller) bearing and used under environment where fretting is easily generated, or the improvement of a retainer that is used at a portion where lubricating oil is insufficient or a portion that requires an oil passing property, due to the restriction on a guide portion, which guides the end face of a retainer, of a mating member where a bearing is assembled.

2. Description of Related Art

Since a very large load is applied to a rotating system of a power mechanism, which is provided in a vehicle such as an automobile and a railroad car, in a radial direction, a radial roller bearing (hereinafter, referred to as a roller bearing or a bearing), which has excellent load capability against the load, has been widely used in the past as a bearing where a rotating shaft of the rotating system is rotatably supported.

The bearing includes an outer member that includes a cylindrical outer raceway on the inner peripheral surface thereof (for example, an outer race or a housing that is always maintained in an irrotational state, a gear or a roller that is rotatable when being used, or the like); a plurality of rollers (as an example, a plurality of needles or the like) that are rotatably assembled between the outer raceway and the outer peripheral surface (inner raceway) of an inner member (for example, an inner race, a shaft, or the like that is rotatable when being used) that is disposed on the inner diameter side of the outer member; and a retainer in which these rollers are disposed at predetermined intervals (as an example, at regular intervals) in a circumferential direction and are retained and which is assembled with the outer and inner members. Further, the retainer includes a pair of annular portions that are concentrically disposed and face each other with a predetermined interval therebetween; and a plurality of pillar portions that connect these annular portions and form pockets, where the rollers are inserted and rotatably retained, by separating the area between the annular portions into areas in the circumferential direction of the annular portions.

Here, a case where a retainer used in a bearing, which includes an outer race as an outer member and a rotating shaft as an inner member, is assembled with an inner raceway portion of the rotating shaft is assumed as an example. In this case, the retainer is inserted from an end portion of the rotating shaft and is moved to the inner raceway portion of the shaft in the axial direction. At that time, if stepped portions, flange-shaped collar portions, or the like, which have an outer diameter set to be larger than the inner diameter of the retainer, protrude from the outer peripheral surface of the shaft between the end portion of the shaft and the inner raceway, the inner peripheral portion of the retainer interfere with these stepped portions or collar portions. For this reason, it is not possible to move the retainer to the inner raceway portion in the axial direction.

For example, a structure where a split portion is formed at a part of a retainer made of a resin, that is, the structure of a retainer where a pair of annular portions is formed in the shape of a substantially circular ring, which is discontinuous, (in the shape of a segmental circular ring) including an incision at a part thereof (as an example, at one position) and both the annular portions are connected to each other at the incision (cutout portion) by an elastic body (elastic connecting portion) in the form of a spring has been known in the past in order to eliminate the above-mentioned inconvenience (see Patent Literature 1).

An example of the structure of the retainer is shown in FIGS. 8A and 8B. In this case, cutout portions 74a and 74b are formed at a pair of annular portions (rim portions) 72a and 72b of a retainer 70, respectively, and these cutout portions 74a and 74b are positioned so that the phases of the cutout portions are shifted from each other in the circumferential direction. Further, there is provided an elastic connecting portion 76 that connects one end portion (as an example, an end portion positioned below the cutout portion 74a) of one rim portion (as an example, the left rim portion 72a in FIG. 8A) of the pair of rim portions 72a and 72b in the circumferential direction to the other end portion (as an example, an end portion positioned above the cutout portion 74b) of the other rim portion (as an example, the right rim portion 72b) in the form of a spring. That is, the elastic connecting portion 76 is formed across one split portion 70a of the retainer 70, so that the elastic connecting portion divides the split portion 70a into two portions.

Due to this structure, the elastic connecting portion 76 is elastically deformed to both sides in the circumferential direction when a force is applied to the retainer 70 in a direction where the size of the split portion 70a is increased. Accordingly, it is possible to stretch the elastic connecting portion (a state shown in FIG. 8B). As a result, it is possible to increase the size of the split portion 70a of the retainer 70, that is, to increase the diameter of the retainer 70. Meanwhile, when a predetermined force applied to the retainer 70 (a force applied in the direction where the size of the split portion 70a is increased) is removed, the size of the elastic connecting portion 76 is reduced to an original state by an elastic restoring force. Accordingly, it is possible to return the split portion 70a of the retainer 70 (the diameter of the retainer 70) to the original state (a state shown in FIG. 8A).

Meanwhile, the diameter of the retainer 70 (the size of the split portion 70a) is not increased in excess of the limit of the stretched length of the elastic connecting portion 76, and the elastic connecting portion 76 also has a function of preventing the diameter of the retainer 70 (the size of the split portion 70a) from being excessively increased.

Accordingly, for example, even if stepped portions, flange-shaped collar portions, or the like, which have an outer diameter set to be larger than the inner diameter of the retainer, protrude from the outer peripheral surface of the shaft between the end portion of the shaft and the inner raceway as described above, it is possible to smoothly move the retainer 70 to the inner raceway portion of the rotating shaft in the axial direction without the interference with the stepped portions or the collar portions by temporarily increasing the size of the split portion 70a of the retainer 70 (temporarily increasing the diameter of the retainer 70).

Further, since rollers are retained in the pockets of the retainer, the increase of rotational resistance, seizure, or the like, which is caused by friction generated due to the contact between the rollers when the rollers roll between the raceways (the outer and inner raceways), is prevented. In addition, bearing lubrication (oil lubrication or grease lubrication) is generally performed in combination in order to more effectively prevent the increase of rotational resistance, seizure, or the like. For this reason, in the past, there have been known the structures of various retainers of which lubrication performance is improved in order to improve lubrication efficiency at the time of bearing lubrication (see Patent Literature 2 to Patent Literature 4).

For example, in the structures of the retainers disclosed in Patent Literature 2 to Patent Literature 4, notches or grooves, which communicate with pockets, are formed on the outer peripheral portions of annular portions in an axial direction in order to increase the flowability of a lubricant and improve the lubrication performance of the retainers.

CITATION LIST

Patent Literature

[PTL 1] German Patent Application Publication No. 4222175
[PTL 2] JP-A-2007-78090
[PTL 3] JP-UM-A-5-3642
[PTL 4] JP-UM-A-5-3643

BRIEF SUMMARY OF THE INVENTION

Technical Problem

However, there are the following problems in the case of the structure of the retainer 70 in the related art.

In this case, flange portions of the retainer 70 (portions in circles shown by a broken line of FIG. 8A) are portions of which the strength is lowest in the entire retainer. In order to increase the strength of the flange portions, it is necessary to reinforce a spring mechanism (the elastic connecting portion 76 and the structure of portions near the elastic connecting portion 76 (connection portions between the rim portions 72a and 72b and the cutout portions 74a and 74b, or the like)). Accordingly, for example, the size of the arrangement area of the spring mechanism needs to be increased in the circumferential direction. In this case, the number of pockets 78, which can be formed at the retainer 70, is reduced as much as the increase of the size of the arrangement area of the spring mechanism. As a result, the reduction of the load capacity of a bearing is caused.

Further, since the shapes of both the flange portions of the retainer 70 in the axial direction are not symmetrical to each other and also have low symmetry, deterioration of the molding accuracy of the retainer 70 is apt to be caused. For example, when the injection molding of the retainer 70 is performed with a resin, the reduction of the volume of the flange portion is much larger than the reduction of the volume of other portions, so that the variation of the volume of the entire retainer 70, which is reduced by cooling after injection molding, is large. For this reason, the reduced volume of the entire retainer does not easily become uniform over the entire circumference.

Further, in the retainer 70, the cutout portion 74a of the rim portion 72a and the cutout portion 74b of the rim portion 72b are positioned so that the phases of the cutout portions are shifted from each other in the circumferential direction. In other words, these cutout portions 74a and 74b are not positioned in the middle of the pitch of two rollers (needles) that are inserted into adjacent pockets 78. Accordingly, for example, when the assembly of the bearing is automated, there is a concern that it is difficult to align the phases of the rollers (needles) inserted into the respective pockets 78 in the circumferential direction and the increase of costs such as the delay of an operation for assembling a bearing is induced.

Furthermore, since notches or grooves are formed on the outer peripheral portions of the annular portions in the structure in the related art, the forms of both end faces of the retainer in the axial direction (that is, the forms of the pair of annular portions) are different on the inner diameter side and the outer diameter side. Specifically, the inner diameter sides of the pair of annular portions are formed of continuous surfaces (of which the inner diameters are constant), and the outer diameter sides of the pair of annular portions are formed of discontinuous surfaces (of which the outer diameters are different at the portions where the notches or grooves are formed and other portions except for the portions).

Accordingly, when a bearing is assembled with a mating member (for example, a rotating shaft or the like), there is a concern that the following problems are caused if a portion of the mating member, which rotates and guides the bearing, is formed not to cover the entire area of an end face of the bearing in the axial direction (bearing-side guide surface), particularly, if the inner diameter of a portion of the mating member, which guides the end face of the retainer, is different on both sides in the axial direction (for example, bushing portions of a DCT (dual clutch transmission)).

That is, when a rotating bearing is guided in the axial direction at a discontinuous portion, of which the area is smaller than the area of a continuous portion of the inner diameter side, of both end faces of the retainer in the axial direction (a pair of annular portions), there is a possibility that the end face of the retainer, which includes the discontinuous portion, is worn away due to friction that is generated between itself and the portion of the mating member, which guides the end face of the retainer, by a pressing force generated by the skew of the roller or the like.

A first object of the invention is to provide a retainer for a radial roller bearing (as an example, one-split resin retainer with a spring) that have excellent strength, moldability, and assemblability while saving the space of a spring mechanism.

A second object of the invention is to provide a retainer for a radial roller bearing that can rotate and guide a bearing in an area larger than the area of discontinuous surfaces in the related art and thus has excellent abrasion resistance by making make all of outer and inner diameter sides of both end faces in an axial direction (that is, a pair of rim portions) come into contact with a guide portion of a mating member as a continuous surface without the restriction in a direction where the bearing (clearly, the retainer) is assembled with the mating member while improving lubrication performance even when the guide portion, which guides the end face of the retainer, of the mating member where a bearing is assembled is not sufficiently secured.

Solution to Problem

According to the first aspect of the present invention, there is provided a retainer for a radial roller bearing. The retainer includes: first and second rim portions that face each other; and a plurality of pillar portions that are provided between the first and second rim portions and connect the first and second rim portions. The first rim portion includes a first cutout portion and is formed in the shape of a discontinuous circular ring. The second rim portion includes a second cutout portion and is formed in the shape of a discontinuous circular ring. The first and second cutout portions are disposed so as to face each other in an axial direction. The respective adjacent pillar portions form pockets in which rolling bodies are rotatably retained. The first rim portion includes first and second end portions that face each other with the first cutout portion interposed therebetween. The second rim portion includes first and second end portions that face each other with the second cutout portion interposed therebetween. The first end portion of the first rim portion and the first end portion of the second rim portion face each other. The second end portion of the first rim portion and the second end portion of the second rim portion face each other. An expandable elastic connecting portion, which connects the first end portion of the first rim portion to the second end portion of the second rim portion, is provided between the first and second rim portions. A convex portion, which protrudes toward the first end portion of the first rim portion, is formed at the second end portion of the first rim portion, and a concave portion is formed at the first end portion of the first rim portion so as to face the convex portion. A convex portion, which protrudes toward the second end portion of the second rim portion, is formed at the first end portion of the second rim portion, and a concave portion is formed at the second end portion of the second rim portion so as to face the convex portion.

According to the second aspect of the present invention, there is provided a retainer for a radial roller bearing. The retainer includes: first and second rim portions that face each other and are formed in the shape of a substantially circular ring; and a plurality of pillar portions that are provided between the first and second rim portions and connect the first and second rim portions. The respective adjacent pillar portions form pockets in which rolling bodies are rotatably retained. The outer and inner diameters of the first and second rim portions are set to be substantially equal to each other. The first rim portion includes a first passage portion that is formed so as to make a lubricant flow. The second rim portion includes a second passage portion that is formed so as to make a lubricant flow. The first passage portion passes through the first rim portion in an axial direction so as to communicate with at least one of the plurality of pockets, respectively. The second passage portion passes through the second rim portion in the axial direction so as to communicate with at least one of the plurality of pockets, respectively.

Advantageous Effects of Invention

According to the first aspect of the invention, it is possible to obtain a retainer for a radial roller bearing (as an example, one-split resin retainer with a spring) that have excellent strength, moldability, and assemblability while saving the space of a spring mechanism.

According to the second aspect of the invention, passage portions communicating with pockets are formed to make a lubricant flow to a pair of rim portion. Accordingly, even when a guide portion, which guides the end face of a retainer, of a mating member where a bearing is assembled is not sufficiently secured, it is possible to make all of the outer and inner diameter sides of both end faces in an axial direction (that is, the pair of rim portions) come into contact with the guide portion of the mating member as a continuous surface without the restriction in a direction where the bearing (clearly, the retainer) is assembled with the mating member while improving lubrication performance. As a result, it is possible to obtain a retainer for a radial roller bearing that can rotate and guide a bearing in an area larger than the area of discontinuous surfaces in the related art and thus has excellent abrasion resistance.

BRIEF DESCRIPTION OF THE DRAWINGS

FIG. 7A is a view showing the structure of a retainer of which the lubrication performance is to be improved and is a view showing the outer peripheral surface of the retainer near the split portion in a normal state;

FIG. 7B is a view showing the structure of a retainer of which the lubrication performance is to be improved and is a cross-sectional view of a pillar portion in a radial direction;

FIG. 7C is a view showing the structure of a retainer of which the lubrication performance is to be improved and is a cross-sectional view taken along a line C-C of FIG. 7B;

DETAILED DESCRIPTION OF THE INVENTION

First Embodiment

A retainer for a radial roller bearing according to the invention will be described below with reference to accompanying drawings. Meanwhile, a bearing or the like, which supports a rotating system of a power mechanism provided in a vehicle such as an automobile or a railroad car, may be assumed as a bearing where the retainer for a radial roller bearing is assembled. However, the bearing where the retainer for a radial roller bearing is assembled is not limited thereto.

The bearing includes an outer member that includes a cylindrical outer raceway on the inner peripheral surface thereof (for example, an outer race or a housing that is always maintained in an irrotational state, a gear or a roller that is rotatable when being used, or the like); and a plurality of radial rollers (as an example, a plurality of needles) that are rotatably assembled between the outer raceway and the outer peripheral surface (inner raceway) of an inner member (for example, an inner race, a shaft, or the like that is rotatable when being used) that is disposed on the inner diameter side of the outer member. Meanwhile, the size of the bearing, the presence or absence of the inner race, the size (diameter or length) of the roller, the number of rollers, and the like may be arbitrarily set according to the use conditions, intended use of the bearing, or the like. Accordingly, the size of the bearing, the presence or absence of the inner race, the size (diameter or length) of the roller, the number of rollers, and the like are not particularly limited here.

Further, these rollers are rotatably retained in pockets by a retainer for a bearing in order to prevent the increase of rotational resistance, seizure, or the like that is caused by friction generated due to the contact between the respective rollers when the rollers roll between the raceways (the outer raceway and the inner raceway). Meanwhile, bearing lubrication (oil lubrication or grease lubrication) may be performed in order to further effectively prevent the increase of rotational resistance, seizure, or the like.

Figure 1:
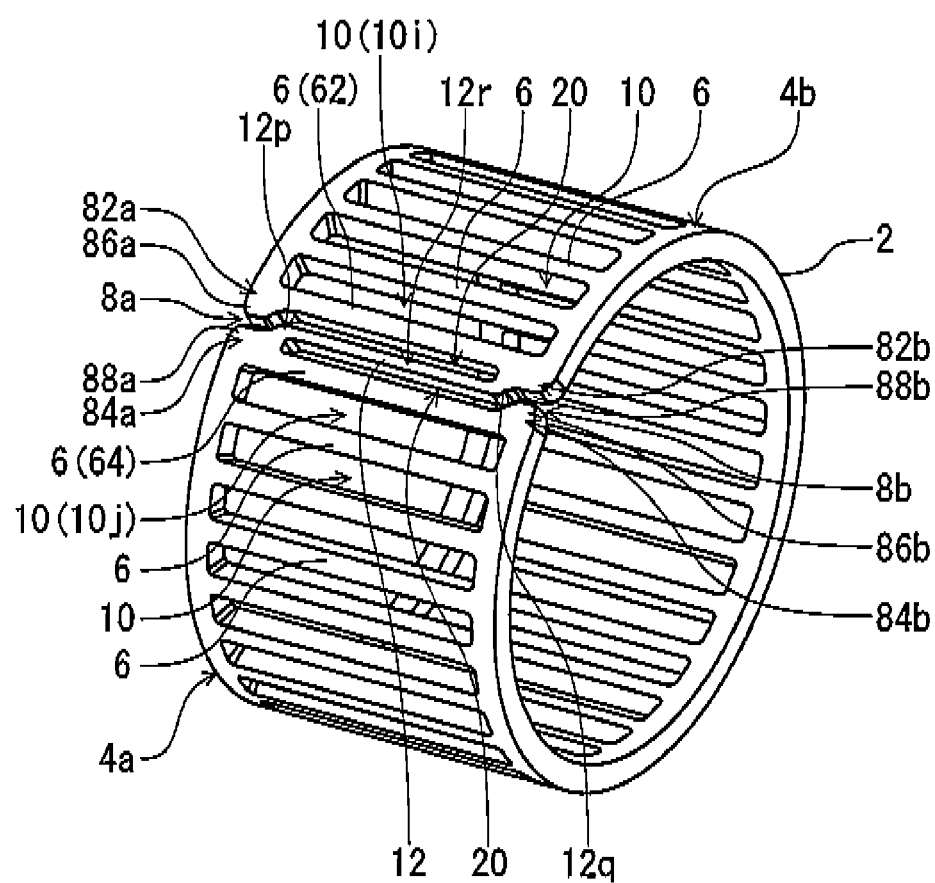
FIG. 1 is a perspective view showing the entire structure of a retainer for a radial roller bearing according to an embodiment of the invention.
Figure 2A:
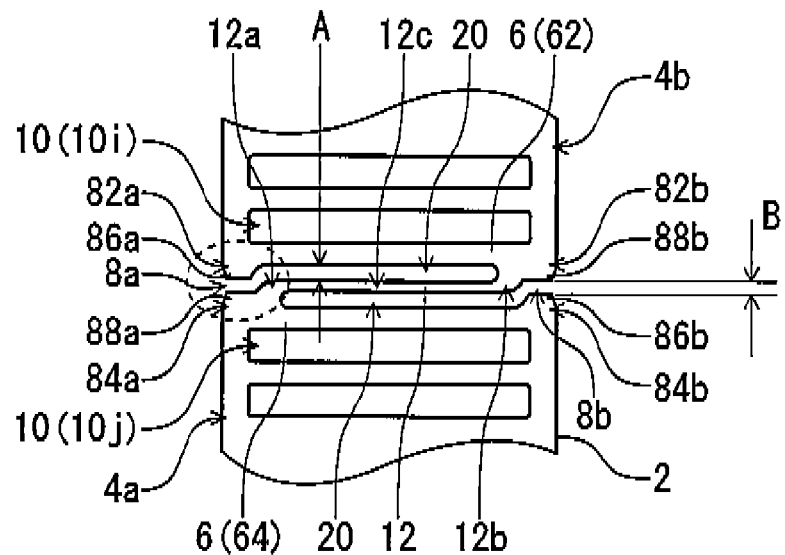
FIG. 2A is a view showing the structure of the retainer for a radial roller bearing according to the embodiment of the invention, and is a view showing the outer peripheral surface of the retainer near a split portion in a normal state (a state where size is not increased and reduced)
Figure 2B:
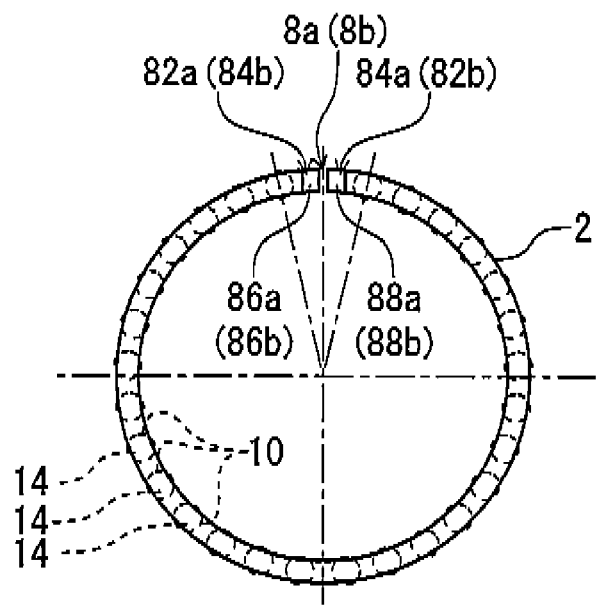
FIG. 2B is a view showing the structure of the retainer for a radial roller bearing according to the embodiment of the invention, and is a side view showing a state where rollers are retained in pockets.

The structure of a retainer for a radial roller bearing (hereinafter, simply referred to as a retainer) according to a first embodiment of the invention is shown in FIGS. 1, 2A, and 2B. Meanwhile, in this embodiment, it is assumed that a retainer 2 is made of a predetermined elastic material (as an example, a resin) and the entire retainer (rim portions 4a and 4b, pillar portions 6, and an elastic connecting portion 12 to be described below) is integrally formed (injection molding) by the injection of the elastic material to a mold. However, the molding using known other methods is not excluded. Further, the retainer 2 as a finished product may be formed by separately performing cutting, grinding, and the like on a molded body after the injection molding.

The retainer 2 includes a pair of rim portions 4a and 4b and a plurality of pillar portions 6. The pair of rim portions 4a and 4b is formed in the shape of a discontinuous segmental circular ring, which includes cutout portions 8a and 8b at one position, respectively (in a substantially C shape). The cutout portions 8a and 8b of the respective rim portions 4a and 4b are concentrically disposed so as to face each other with a predetermined interval therebetween in an axial direction (a horizontal direction of FIG. 2A) while having the same phase in the circumferential direction (while the positions of the cutout portions 8a and 8b in the circumferential direction correspond to each other). That is, the retainer 2 has a substantially cylindrical appearance shape that includes one split portion 20 in the circumferential direction (so-called one-split retainer structure). Meanwhile, the diameter of each of the rim portions 4a and 4b or the interval between the rim portions 4a and 4b facing each other in the axial direction may be arbitrarily set according to the size or the like of the bearing.

The plurality of pillar portions 6 connect the pair of rim portions 4a and 4b in the axial direction and form pockets 10 where rolling bodies, that is, rollers (needles) 14 (FIG. 2B) are inserted and rotatably retained, by separating the area between the rim portions 4a and 4b into areas in the circumferential direction of the rim portions 4a and 4b. That is, one pocket 10 is formed in the space surrounded by two pillar portions 6, which are adjacent to each other in the circumferential direction, and the pair of rim portions 4a and 4b. Accordingly, the retainer 2 has a structure where the pillar portions 6 and the pockets 10 are alternately disposed in the circumferential direction. However, a split portion 20 is present and the pocket 10 is not formed in the area between the rim portions 4a and 4b that is separated by two pillar portions 6 disposed close to both sides of the cutout portions 8a and 8b of the respective rim portions 4a and 4b in the circumferential direction (hereinafter, referred to as cutout portion-adjacent pillar portions 62 and 64). Accordingly, the retainer 2 has a structure where a roller 14 is not provided in the area (that is, the split portion 20), that is, a structure where the rollers 14 are inserted into the respective pockets 10 except for the above-mentioned area one by one and these rollers 14 are disposed in the circumferential direction at regular intervals (the same pitch).

Further, as described above, the cutout portions 8a and 8b of the pair of rim portions 4a and 4b have the same phase in the circumferential direction (the positions of the cutout portions 8a and 8b in the circumferential direction correspond to each other). Furthermore, in this embodiment, the cutout portions 8a and 8b are formed at the middle position of the pitch of two pillar portions 6, which are disposed close to both sides of these cutout portions 8a and 8b in the circumferential direction (cutout portion-adjacent pillar portions 62 and 64), in the circumferential direction. That is, the cutout portions 8a and 8b are formed at the respective rim portions 4a and 4b so that the middle positions of the cutout portions 8a and 8b in the circumferential direction correspond to the middle position of the pitch of the rollers 14 inserted into two pockets 10 (pockets 10i and 10j) formed by the cutout portion-adjacent pillar portions 62 and 64.

Accordingly, the retainer 2 has a structure where the middle position of the split portion 20 in the circumferential direction correspond to the middle of the pitch of the rollers 14 inserted into two pockets 10 (pockets 10i and 10j) formed by the cutout portion-adjacent pillar portions 62 and 64. Therefore, when the assembly of the bearing is automated, it is easy to align the phases of the rollers 14 inserted into the respective pockets 10 in the circumferential direction and to also position the retainer 2 when the retainer 2 is assembled with the outer member and the inner member. That is, the automation of the assembly of the bearing is facilitated. Further, since it is possible to align phases by disposing the split portion 20 and the respective rollers 14, which are inserted into the pockets 10, in the retainer 2 in the circumferential direction at substantially regular intervals (the same pitch), versatility is increased and there is a possibility that cost is reduced.

Meanwhile, the size of each of the pockets 10 formed by the pillar portions 6 may be set according to the diameter and length of the roller 14 so that the rollers 14 can be rotatably retained in the pockets 10. The number of the pockets 10 (that is, the number of the pillar portions 6) may be arbitrarily set so as to correspond to the capacity (the number of the retained rollers 14) of the retainer 2. Moreover, the shape of a pocket surface (the contact surface coming into contact with the peripheral surface of the roller 14) (that is, the shape of each of the surfaces of the adjacent pillar portions 6 facing each other in the circumferential direction) may be the shape of a concave-curved surface (for example, the shape of a concave-curved surface having a curvature slightly smaller than the curvature of the peripheral surface of the roller 14). A protruding portion that narrows a pocket opening (for example, an unguiform protrusion or the like that holds the roller 14) may be formed at the peripheral edge portion of the pocket 10 so that the roller 14 inserted into the pocket 10 is undetachably retained.

An expandable elastic connecting portion 12 is formed at the pair of rim portions 4a and 4b. The expandable elastic connecting portion 12 connects one end portion 84a (as an example, an end portion in the circumferential direction positioned below the cutout portion 8a in FIG. 2A) of both end portions 82a and 84a of one rim portion (as an example, the rim portion 4a positioned on the left side in FIG. 2A), which face each other with the cutout portion 8a interposed therebetween, in the circumferential direction to the other end portion 82b (as an example, the end portion in the circumferential direction positioned above the cutout portion 8b in FIG. 2A) of both end portions 82b and 84b of the other rim portion (as an example, the rim portion 4b positioned on the right side in FIG. 2A), which face each other with the cutout portion 8b interposed therebetween, in the circumferential direction. That is, the elastic connecting portion 12 is formed across the split portion 20 from a connection portion between the cutout portion-adjacent pillar portion 64 and the rim portion 4a (a root portion of the cutout portion-adjacent pillar portion 64 close to the rim portion 4a) to a connection portion between the cutout portion-adjacent pillar portion 62 and the rim portion 4b (a root portion of the cutout portion-adjacent pillar portion 62 close to the rim portion 4b). Accordingly, the elastic connecting portion 12 divides the split portion 20 into two portions (see FIG. 2A).

In this case, the elastic connecting portion 12 includes both end portions 12a and 12b that are connected to the rim portions 4a and 4b, and an intermediate portion 12c that extends between the both end portions 12a and 12b, one end portion 12a (a left end portion of FIG. 2A) of the elastic connecting portion 12 is connected to the end portion 84a of the rim portion 4a in the circumferential direction (the root portion of the cutout portion-adjacent pillar portion 64 close to the rim portion 4a) so as to be inclined downward to the left (upward to the right), the intermediate portion 12c extends to the other end portion 12b (a right end portion of FIG. 2A) from the one end portion 12a in the axial direction (a horizontal direction of FIG. 2A) (so as to be parallel to the axial direction), and the other end portion 12b is connected to the end portion 82b of the rim portion 4b in the circumferential direction (the root portion of the cutout portion-adjacent pillar portion 62 close to the rim portion 4b) so as to be inclined upward to the right (downward to the left). Accordingly, the elastic connecting portion 12 is in a state where the elastic connecting portion is formed so as to be inclined substantially downward to the left (upward to the right) as a whole.

Meanwhile, a structure where the elastic connecting portion 12 is formed so as to connect the end portion 84a of the rim portion 4a in the circumferential direction to the end portion 82b of the rim portion 4b in the circumferential direction (a structure where the elastic connecting portion 12 is formed so as to be inclined substantially downward to the left (upward to the right) in FIG. 2A) has been shown in FIGS. 1 and 2A. However, the elastic connecting portion may be formed so as to connect the end portion 82a of the rim portion 4a in the circumferential direction to the end portion 84b of the rim portion 4b in the circumferential direction (the elastic connecting portion may be formed so as to be inclined substantially upward to the left (downward to the right) in FIG. 2A. Specifically, one end portion (which corresponds to a left end portion in FIG. 2A) of the elastic connecting portion may be connected to the end portion 82a of the rim portion 4a in the circumferential direction (the root portion of the cutout portion-adjacent pillar portion 62 close to the rim portion 4a) so as to be inclined upward to the left (downward to the right), the intermediate portion may extend to the other end portion (a right end portion of FIG. 2A) from the one end portion in the axial direction (a horizontal direction of FIG. 2A) (so as to be parallel to the axial direction), and the other end portion may be connected to the end portion 84b of the rim portion 4b in the circumferential direction (the root portion of the cutout portion-adjacent pillar portion 64 close to the rim portion 4b) so as to be inclined downward to the right (upward to the left). Accordingly, the elastic connecting portion may be in a state where the elastic connecting portion is formed so as to be inclined substantially upward to the left (downward to the right) as a whole.

Even though the elastic connecting portion is formed across in any state, the axial length and the circumferential width of the elastic connecting portion 12 may be arbitrarily set according to the size or the like of the retainer 2 and are not particularly limited.

Figure 3:
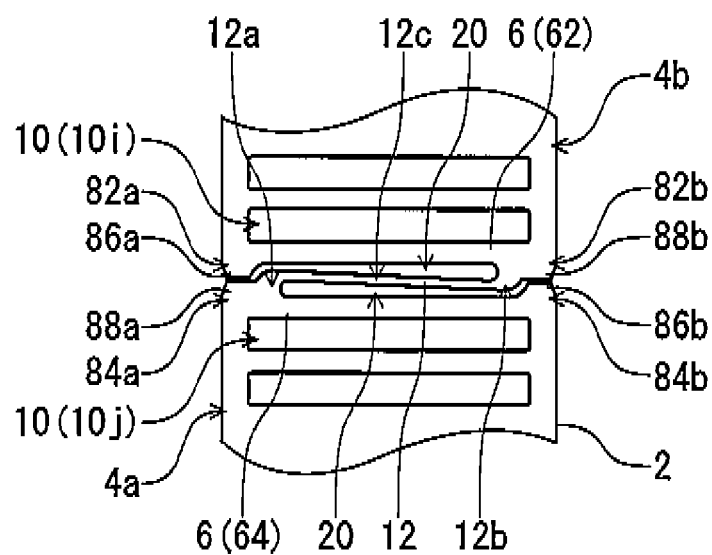
FIG. 3 is a view showing the outer peripheral surface of the retainer near the split portion when the diameter of the retainer for a radial roller bearing according to the embodiment of the invention is reduced (when the size of the split portion is reduced)

As described above, the rim portions 4a and 4b are connected to each other by the elastic connecting portion 12. Accordingly, when a force is applied to the retainer 2 in a direction where the size of the split portion 20 (clearly, the cutout portions 8a and 8b of the rim portions 4a and 4b) is increased, the elastic connecting portion 12 is elastically deformed to both sides in the circumferential direction (in the direction where the size of the split portion 20 is increased) and the state of the intermediate portion 12c is changed into a state where the intermediate portion is inclined (a state where the intermediate portion is inclined downward to the left (upward to the right) in FIG. 2A) from a state where the intermediate portion is parallel to the axial direction (a state shown in FIG. 2A). Therefore, the elastic connecting portion 12 is stretched. As a result, it is possible to increase the size of the split portion 20 (the cutout portions 8a and 8b), that is, to increase the diameter of the retainer 2. Further, when a force is applied to the retainer 2 in a direction where the size of the split portion 20 (clearly, the cutout portions 8a and 8b of the rim portions 4a and 4b) is reduced, the intermediate portion 12c of the elastic connecting portion 12 is elastically deformed and stretched to a state where the intermediate portion is inclined in a direction opposite to the direction at the time of the increase of the size of the split portion 20 (a state where the intermediate portion is inclined upward to the left (downward to the right) as shown in FIG. 3) from a state where the intermediate portion is parallel to the axial direction (a state shown in FIG. 2A). Accordingly, the split portion 20 is crushed. As a result, it is possible to reduce the size of the split portion 20 (the cutout portions 8a and 8b), that is, to reduce the diameter of the retainer 2. In this embodiment, the cutout portions 8a and 8b of the pair of rim portions 4a and 4b have the same phase in the circumferential direction and are formed at the middle position of the pitch of the cutout portion-adjacent pillar portions 62 and 64 in the circumferential direction (the middle position of the pitch of the rollers 14 inserted into the pockets 10i and 10j). Accordingly, it is possible to uniformly increase or reduce the size of these cutout portions 8a and 8b without the imbalance (to increase or reduce the diameter of the retainer 2 without swinging).

Furthermore, when a predetermined force applied to the retainer 2 (a force applied in the direction where the size of the split portion 20 (the cutout portions 8a and 8b) is increased or reduced) is removed, the elastic connecting portion 12 can return to the original state by an elastic restoring force. Accordingly, the split portion 20 (the cutout portions 8a and 8b) of the retainer 2, that is, the diameter of the retainer 2 can return to the original state (the state shown in FIGS. 1, 2A, and 2B). Meanwhile, since the diameter of the retainer 2 is increased within the limit of the stretched length of the elastic connecting portion 12, the diameter of the retainer 2 is not excessively increased in excess of the limit. Since the diameter of the retainer is reduced within the range until convex portions 86a and 86b and concave portions 88a and 88b of the pair of rim portions 4a and 4b come into contact with each other as described below, the diameter of the retainer is not excessively reduced so as to exceed the contact range.

As described above, the elastic connecting portion 12 freely increase and reduce the diameter of the retainer 2 within a predetermined range by the function of a so-called spring (so-called retainer structure with a spring). Accordingly, for example, a bearing where the retainer 2 is assembled is rotated integrally with a gear, and the size of the retainer 2 is increased in the radial direction (the diameter of the retainer 2 is increased) by a centrifugal force generated at that time. Meanwhile, the retainer 2 smoothly returns to the original state (the diameter of the retainer 2 is reduced) at the time of low speed rotation (at the time of deceleration). Therefore, it is possible to change and adjust a contact position between the pocket surface and the peripheral surface (rolling surface) of the roller 14 and to effectively prevent damage such as fretting from being generated on the retainer 2. Further, even when a very large load (for example, a radial load) is applied to a bearing where the retainer 2 is assembled, the diameter of the retainer 2 is flexibly increased or reduced, so that the contact position between the pocket surface and the peripheral surface of the roller 14 is changed and adjusted and it is possible to efficiently release a load. Accordingly, it is possible to improve the durability (as an example, fretting resistance) of the retainer 2.

Figure 6:
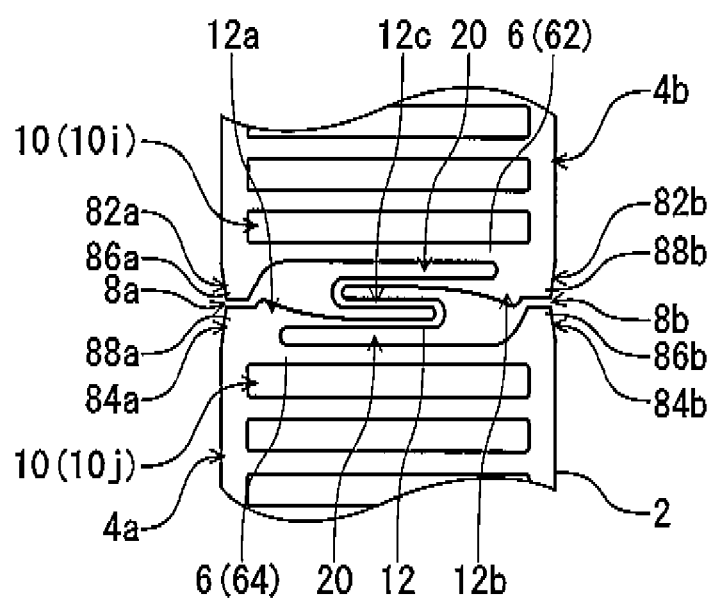
FIG. 6 is a view showing the outer peripheral surface near a split portion of a retainer of which an elastic connecting portion (intermediate portion) is formed in an S shape.
Figure 8A:
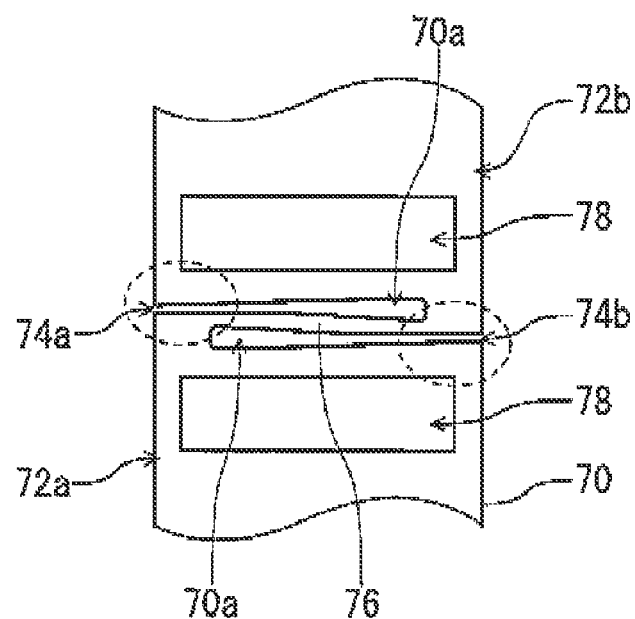
FIG. 8A is a view showing the structure of a retainer for a radial roller bearing in the related art, and is a view showing the outer peripheral surface of the retainer near a split portion in a normal state.
Figure 8B:
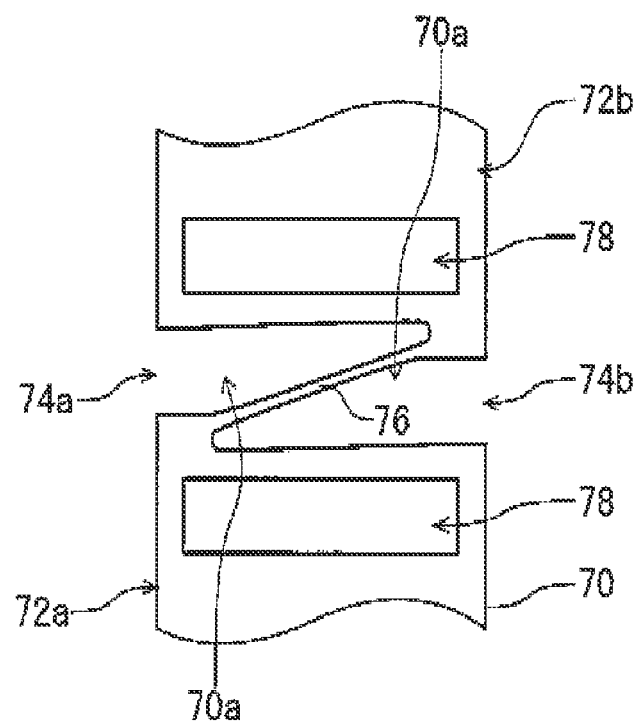
FIG. 8B is a view showing the structure of the retainer for a radial roller bearing in the related art, and is a view showing the outer peripheral surface of the retainer near the split portion in a state where the diameter of the retainer is increased.

Meanwhile, in this embodiment (FIGS. 1, 2A, and 2B), the intermediate portion 12c of the elastic connecting portion 12 has extended linearly from one end portion 12a to the other end portion 12b in the axial direction (so as to be parallel to the axial direction). However, for example, as shown in FIG. 6, the intermediate portion 12c may be bent in a substantially S shape and extend from one end portion 12a to the other end portion 12b.

If the intermediate portion is bent in the substantially S shape, it is possible to more flexibly increase and reduce the diameter of the retainer 2.

Accordingly, for example, even though the diameter of the retainer 2 is increased to the limit of the stretched length of the elastic connecting portion 12 (the size of the split portion 20 is increased) when a bearing where the retainer 2 is assembled is assembled with a rotating shaft or the like including stepped portions or collar portions, it is possible to prevent the generation or the like of whitening, cracks, or plastic deformation on the retainer 2 (specifically, a portion positioned on the opposite side of the split portion 20 with respect to the center (a portion of which the phase is shifted from the phase of the split portion 20 in the circumferential direction by about 180°)). Further, since it is possible to easily control the stretched length of the elastic connecting portion 12, that is, the increase and reduction range of the diameter of the retainer 2 by adjusting the axial width (the dimension in the horizontal direction of FIG. 6) of the substantially S-shaped intermediate portion 12c, it is possible to cope with the assembly of a bearing with a rotating shaft that includes stepped portions, collar portions, or the like having various sizes. Furthermore, the contact position between the pocket surface and the peripheral surface (rolling surface) of the roller 14 is more flexibly changed and adjusted, so that it is possible to more efficiently perform the increase of the diameter of the retainer 2 by a centrifugal force, the reduction of the diameter of the retainer at the time of low speed rotation (at the time of deceleration), the release of a load, or the like and to effectively prevent damage such as fretting from being generated on the retainer 2. In addition, for example, even though a bearing where the retainer 2 is assembled is inclined together with a gear and different thrust loads are applied to the rollers 14 that are retained in the pockets 10 with a phase difference of about 180° in the circumferential direction, it is possible to reliably absorb these thrust loads by the S-shaped structure of the intermediate portion 12c. Accordingly, it is possible to effectively avoid an excessive force being applied to the entire elastic connecting portion 12.

Here, the assembly of the retainer 2 with the outer member and the inner member (that is, the assembly of a bearing) may be performed while positioning members (for example, positioning pins or the like) 16 are inserted into the respective cutout portions 8a and 8b (see FIGS. 5A and 5B) so as to suppress the increase and reduction of the size of the split portion 20 (the cutout portions 8a and 8b) and a constant diameter (normal diameter) is maintained without the increase or reduction of the diameter of the retainer 2. Accordingly, the shape of the retainer 2 is stable and the retainer is smoothly and easily assembled with the outer member and the inner member. Meanwhile, the positioning members 16 inserted into the respective cutout portions 8a and 8b may be extracted after the retainer is completely assembled with the outer member and the inner member.

Further, in this embodiment, the convex portion 86a, which protrudes toward one end portion 84a, is formed at the other end portion 82a (as an example, the end portion in the circumferential direction positioned above the cutout portion 8a in FIG. 2A) of both end portions 82a and 84a of one rim portion 4a in the circumferential direction, and the concave portion 88a, which is recessed so as to correspond to the convex portion 86a of the other end portion 82a, is formed at the one end portion 84a. Meanwhile, the convex portion 86b, which protrudes toward the other end portion 82b, is formed at one end portion 84b (as an example, the end portion in the circumferential direction positioned below the cutout portion 8b in FIG. 2A) of both end portions 82b and 84b of the other rim portion 4b in the circumferential direction, and the concave portion 88b, which is recessed so as to correspond to the convex portion 86b of the one end portion 84b, is formed at the other end portion 82b.

That is, the concave portions 88a and 88b are formed at the root portions of the elastic connecting portion 12 (the connection portion between the cutout portion-adjacent pillar portion 64 and the rim portion 4a and the connection portion between the cutout portion-adjacent pillar portion 82 and the rim portion 4b), and serve as clearances for the prevention of the interference (contact) between the elastic connecting portion 12 and the convex portions 86a and 86b when the elastic connecting portion 12 is elastically deformed as shown in FIG. 3 and is inclined with respect to the axial direction (the horizontal direction in FIG. 3) so that the size of the split portion 20 is reduced and the diameter of the retainer 2 is reduced. Since the concave portions 88a and 88b serve as clearances as described above, it is possible to make the convex portions 86a and 86b not come into contact with the elastic connecting portion 12 but come into contact with these concave portions 88a and 88b when the diameter of the retainer 2 is reduced (the size of the split portion 20 is reduced) and to elastically deform the elastic connecting portion 12 in a free state without making the elastic connecting portion 12 interfere with the convex portions 86a and 86b. Accordingly, since the diameter of the retainer 2 is reduced within the range until the convex portions 86a and 86b and the concave portions 88a and 88b come into contact with each other, the diameter of the retainer 2 is not excessively reduced in excess of the contact range. Meanwhile, in a state where the convex portions 86a and 86b and the concave portions 88a and 88b completely come into contact with each other (a state shown in FIG. 3), all of the cutout portions 8a and 8b of the rim portions 4a and 4b are lost and these rim portions 4a and 4b are connected not in the shape of a substantially circular ring that is discontinuous (in the shape of a segmental circular ring) but in the shape of a circular ring.

Accordingly, even when the elastic connecting portion 12 is formed at the retainer 2 so that the retainer 2 has a structure with a spring, it is possible to improve the strength of a flange portion of the retainer 2 (a portion that includes the contact area between the convex portions 86a and 86b and the concave portions 88a and 88b shown in a circle of a broken line of FIG. 2A, and the respective root portions of the elastic connecting portion 12, the cutout portion-adjacent pillar portions 62 and 64, and the pockets 10i and 10j). That is, even though the size of the arrangement area of such a spring mechanism (the elastic connecting portion 12 and the structure near the elastic connecting portion 12) is equal to that in the related art, it is possible to improve the strength of the flange portion that has the lowest strength in the entire retainer. That is, it is possible to save the space of the spring mechanism of the retainer 2, to increase the number of retained rollers 14 (the number of the formed pillar portions 6 and pockets 10), and to further increase the capacity of the retainer 2. Further, since it is possible to improve the strength of the flange portion, the reduction of the volume of the flange portion, which is reduced by cooling, is suppressed even when the retainer 2 is formed by the injection molding of an elastic material (as an example, a resin). Accordingly, it is possible to reduce the variation of the volume of the entire retainer 2 that is reduced by cooling after injection molding, so that it is possible to increase the molding accuracy of the retainer 2.

Meanwhile, in FIGS. 2A and 2B, the convex portions 86a and 86b protrudes in a substantially trapezoidal shape so as to be tapered toward the concave portions 88a and 88b, and the concave portions 88a and 88b are recessed in a substantially trapezoidal shape so as to be gradually widened toward the convex portions 86a and 86b and are connected to the elastic connecting portion 12. In this case, like the other end portion 82a of the rim portion 4a and one end portion 84b of the rim portion 4b (these correspond to the inclined surfaces of the substantially trapezoidal shape), the side surfaces of one end portion 84a of the rim portion 4a and the other end portion 82b of the rim portion 4b are gradually recessed toward the end portions in the circumferential direction so as to have an inclined shape (tapered shape).

As described above, in the structure shown in FIGS. 2A and 2B, each of the portions of the convex portions 86a and 86b and the concave portions 88a and 88b, which face each other, is formed of a flat surface. Accordingly, when the diameter of the retainer 2 is reduced (when the size of the split portion 20 is reduced), the convex portions 86a and 86b and the concave portions 88a and 88b come into surface contact with each other (see FIG. 3).

Figure 4A:
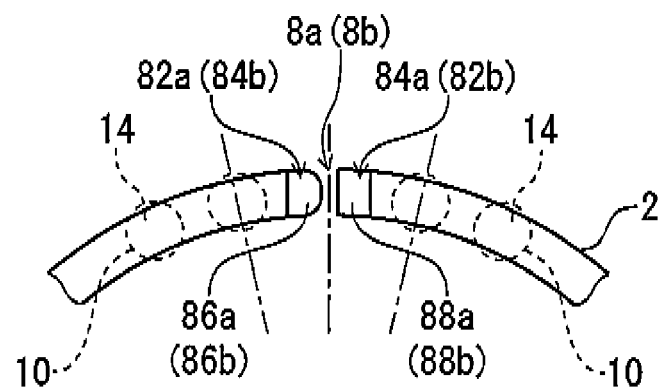
FIG. 4A is a view showing the structure of convex and concave portions of rim portions and is a view showing a structure where the contact form of the convex and concave portions is line contact when the diameter of the retainer is reduced (when the size of the split portion is reduced)
Figure 4B:
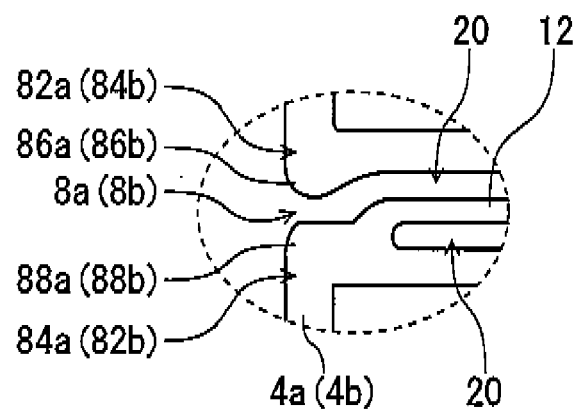
FIG. 4B is a view showing the structure of the convex and concave portions of the rim portion and is a view showing a structure where the contact form of the convex and concave portions is point contact when the diameter of the retainer is reduced (when the size of the split portion is reduced)

The contact form of the convex portions 86a and 86b and the concave portions 88a and 88b at the time of the reduction of the diameter of the retainer 2 (at the time of the reduction of the size of the split portion 20) is not limited to surface contact, and may be line contact or point contact as in the structure shown in FIGS. 4A and 4B. For example, FIG. 4A shows a structure where the convex portions 86a and 86b protrude toward the concave portions 88a and 88b in a convex curved shape (circular arc shape) so that the contact form of these convex portions is line contact. FIG. 4B shows a structure where the convex portions 86a and 86b protrude toward the concave portions 88a and 88b in a spherical shape so that the contact form of these convex portions is point contact. Meanwhile, the structure of the convex portions 86a and 86b and the concave portions 88a and 88b, which makes the contact form be line contact or point contact, is not limited to the structure shown in the drawings (FIGS. 4A and 4B).

Figure 5A:
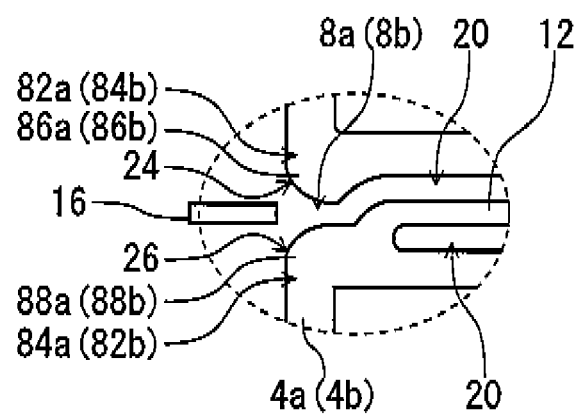
FIG. 5A is a view illustrating a method of assembling a bearing and is a view showing a state where a positioning member (positioning pin) is not yet inserted into a cutout portion of the retainer.
Figure 5B:
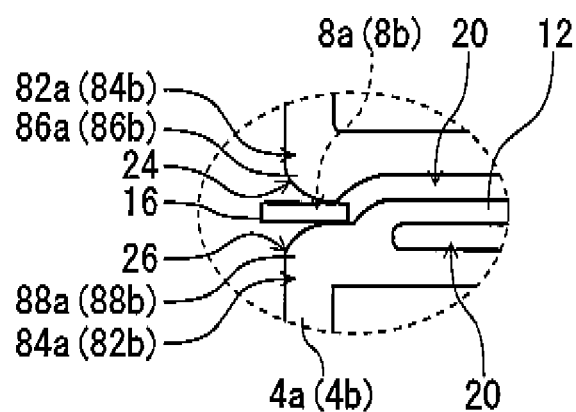
FIG. 5B is a view illustrating a method of assembling a bearing and is a view showing a state where the positioning member (positioning pin) is inserted into the cutout portion of the retainer.

Further, it is preferable that continuous portions 24 between the convex portions 86a and 86b and the side surfaces of the rim portions 4a and 4b and continuous portions 26 between the concave portions 88a and 88b and the side surfaces of the rim portions 4a and 4b be chamfered in a circular arc shape or oval shape (be subjected to surface finishing in a rounded shape) as shown in FIGS. 5A and 5B, respectively. If the continuous portions 24 and 26 are rounded as described above, the positioning members (for example, positioning pins or the like) 16 are easily inserted to the respective cutout portions 8a and 8b when the retainer 2 is assembled with the outer member and the inner member (that is, when a bearing is assembled).

Meanwhile, while the retainer 2 is maintained at a constant diameter (normal diameter) without the increase or reduction of the diameter of the retainer 2, the interval (a distance A shown in FIG. 2A) of the split portion 20, which is divided into two portions by the elastic connecting portion 12, in the circumferential direction is set to be larger than the interval (a distance B shown in FIG. 2A) of each of the cutout portions 8a and 8b in the circumferential direction (A>B). Due to this setting, it is possible to make the convex portions 86a and 86b and the concave portions 88a and 88b smoothly come into contact with each other without applying an unnecessary force to the elastic connecting portion 12 when the diameter of the retainer 2 is reduced (the size of the split portion 20 is reduced). If the interval (the distance A) of the split portion 20 in the circumferential direction is set to be equal to or smaller than the interval (the distance B) of each of the cutout portions 8a and 8b in the circumferential direction (AB), the elastic connecting portion 12 comes into contact with the pillar portion 6 (the cutout portion-adjacent pillar portions 62 and 64) before the convex portions 86a and 86b comes into contact with the concave portions 88a and 88b at the time of the reduction of the diameter of the retainer 2 (at the time of the reduction of the size of the split portion 20). For this reason, an excessive force is applied to the elastic connecting portion 12, so that damage to the retainer 2 is apt to be induced.

Furthermore, as shown in FIGS. 7A to 7C, tapers 18a and 18b of which the diameter is gradually reduced toward the outer peripheral edge may be formed at the outer peripheral surfaces of the rim portions 4a and 4b (FIGS. 7A and 7B), and stepped portions 20a and 20b of which the diameters of inner peripheral edges are uniformly increased may be formed at the inner peripheral edges (FIG. 7B). Moreover, grooves (grooves (of which the shape and size are not limited) that store a lubricant (as an example, lubricating oil)) 22 recessed in the axial direction may be formed on the outer peripheral surfaces of the pillar portions 6 (FIGS. 7A to 7C). Since the tapers 18a and 18b, the stepped portions 20a and 20b, and the grooves 22 are formed, it is possible to increase the flowability, storage performance, and circulation performance of a lubricant (as an example, lubricating oil) in the retainer 2 and to improve the lubrication performance of not only the retainer 2 but also the bearing.

As described above, according to the retainer 2 of this embodiment, it is possible to significantly improve all of strength, moldability, and assemblability while saving the space of the spring mechanism.

Other Embodiments

Rollers, which are rolling bodies, are rotatably retained in the pockets by the retainer for a bearing in order to prevent the increase of rotational resistance, seizure, or the like that is caused by friction generated due to the contact between the respective rollers when the rollers roll between the raceways (the outer raceway and the inner raceway). Further, bearing lubrication (oil lubrication or grease lubrication) is performed in order to more effectively prevent the increase of rotational resistance, seizure, or the like. Meanwhile, the retainer for a bearing may be formed using any guide method among a method of guiding the rolling bodies (the guide of the rollers), a method of guiding the outer race, and a method of guiding the inner race.

Figure 9:
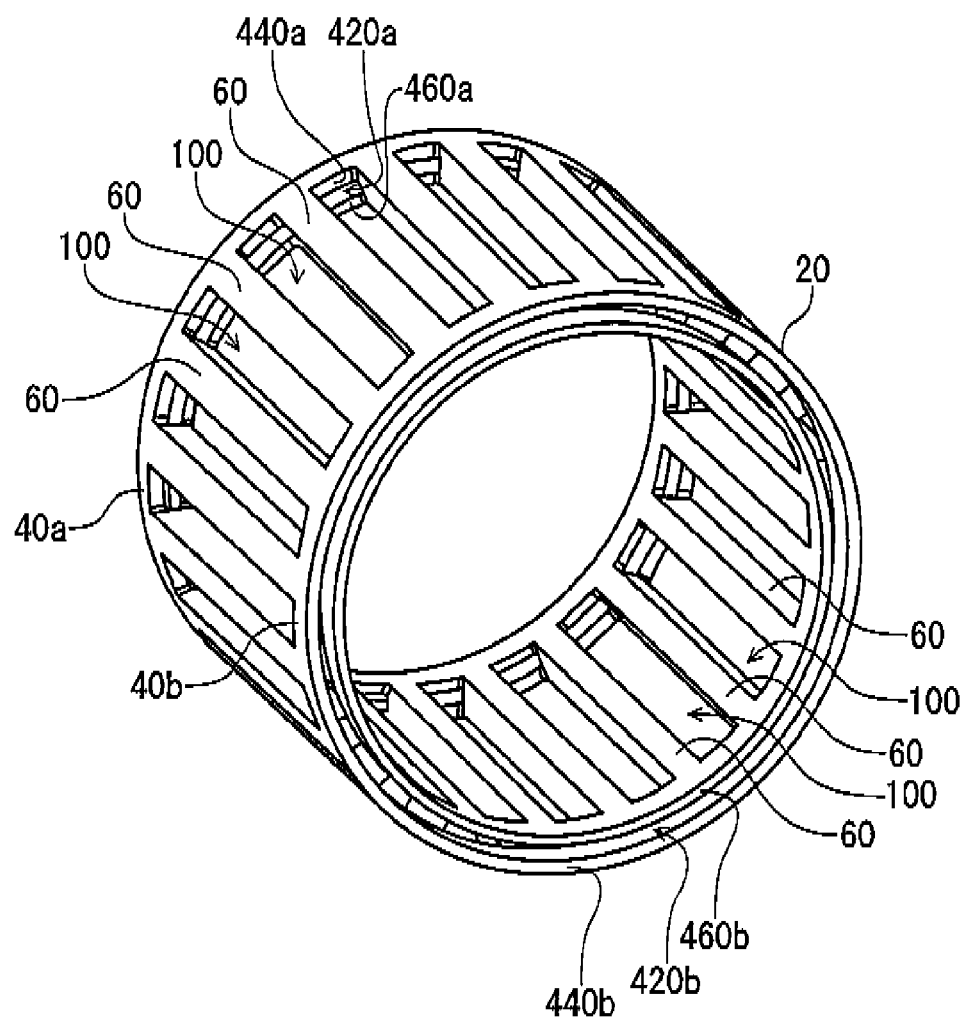
FIG. 9 is a perspective view showing the entire structure of a retainer for a radial roller bearing according to a first embodiment of the invention.

The structure of a retainer 20 for a radial roller bearing (hereinafter, simply referred to as a retainer) according to a second embodiment of the invention is shown in FIG. 9. Meanwhile, in this embodiment, it is assumed that the retainer 20 is made of a predetermined elastic material (as an example, a resin) and the entire retainer (rim portions 40a and 40b and pillar portions 60 to be described below) is integrally formed (injection molding) by the injection of the elastic material to a mold. However, the molding using known other methods is not excluded. For example, a machined retainer may also be assumed. Further, the retainer 20 as a finished product may be formed by separately performing cutting, grinding, and the like on a molded body after the injection molding.

In this embodiment, as described above, the retainer 20 is assembled in a radial roller bearing that is lubricated by a lubricant (lubricating oil or grease) and rollers, that is, rolling bodies are rotatably retained by the retainer. The retainer 20 includes a pair of substantially annular rim portions 40a and 40b that is concentrically disposed so as to face each other with a predetermined interval therebetween in an axial direction; and a plurality of pillar portions 60 that connect these rim portions 40a and 40b and form pockets 100 where rollers (needles (not shown)) are inserted and rotatably retained, by separating the space area between the rim portions 40a and 40b into areas in the circumferential direction. That is, one pocket 1000 is formed in the space surrounded by two pillar portions 60, which are adjacent to each other in the circumferential direction, and the pair of rim portions 40a and 40b. Accordingly, the retainer 20 has a structure where the pillar portions 60 and the pockets 100 are alternately disposed in the circumferential direction, the rollers are inserted into the respective pockets 100 one by one, and these rollers are disposed in the circumferential direction at regular intervals (the same pitch).

Meanwhile, the size of each of the pockets 100 formed by the pillar portions 60 may be set according to the diameter and length of the roller so that the rollers can be rotatably retained in the pockets 100. The number of the pockets 100 (that is, the number of the pillar portions 60) may be arbitrarily set so as to correspond to the capacity (the number of the retained rollers) of the retainer 20. Moreover, the shape of a pocket surface (the contact surface coming into contact with the peripheral surface of the roller) (that is, the shape of each of the surfaces of the adjacent pillar portions 60 facing each other in the circumferential direction) may be the shape of a concave-curved surface (for example, the shape of a concave-curved surface having a curvature slightly smaller than the curvature of the peripheral surface of the roller). A protruding portion that narrows a pocket opening (for example, an unguiform protrusion or the like that holds the roller) may be formed at the peripheral edge portion of the pocket 100 so that the roller inserted into the pocket 100 is undetachably retained.

All of the pair of rim portions 40a and 40b has outer and inner diameters that are set constant, and includes passage portions 420a and 420b through which a lubricant flows. The passage portions 420a and 420b pass through the rim portions 40a and 40b in the axial direction, respectively, so as to communicate with at least the plurality of pockets 100. The structure of the retainer 20 where annular grooves formed along the circumferential direction are formed at the respective rim portions 40a and 40b as the passage portions 420a and 420b is shown in FIG. 9 as an example. That is, the rim portions 40a and 40b have double annular structures where outer diameter-side rim portions 440a and 440b and inner diameter-side rim portions 460a and 460b are concentrically arranged with the passage portions 420a and 420 interposed therebetween, respectively.

In this case, the passage portions 420a and 420b continue in the circumferential direction, pass through the rim portions 40a and 40b from one side to the other side in the axial direction at portions having the same phases as the phases of the pockets 100 in the circumferential direction, and communicate with the pockets 100. Meanwhile, in this case, the pocket 100 may communicate with the passage portions 420a and 420b over the entire width of the pocket 100 in the circumferential direction, and may communicate with the passage portions 420a and 420b at only a part of the width of the pocket in the circumferential direction. Further, the depths of the passage portions 420a and 420b in the axial direction may be adjusted so that the bottom portions (groove bottoms) of the passage portions 420a and 420b in the axial direction substantially correspond to the axial positions of the end portions of the pillar portions 60 in the axial direction at the portions having the same phases as the phases of the pillar portions 60 in the circumferential direction. However, it may also be assumed that the bottom portions (groove bottoms) of the passage portions 420a and 420b are shallower than communication ports between the pocket 100 and the passage portions 420a and 420b (the end portions of the pillar portions 60 in the axial direction protrude further than the communication ports).

Moreover, in the structure shown in FIG. 9, the passage portions 420a and 420b have the outer diameters (that is, the inner diameters of the outer diameter-side rim portions 440*a* and 440*b*) and the inner diameters (that is, the outer diameters of the inner diameter-side rim portions 460*a* and 460*b*) that are set to diameters constant in the axial direction. That is, the passage portions 420*a* and 420*b* (that is, the inner peripheral portions of the outer diameter-side rim portions 440*a* and 440*b* and the outer peripheral portions of the inner diameter-side rim portions 460*a* and 460*b*) are formed in the shape of a cylinder that has constant inner and outer diameters in the axial direction (so-called straight cylindrical shape).

Meanwhile, the widths of the passage portions 420*a* and 420*b* in the radial direction (the differences between the inner and outer diameters of the passage portions 420*a* and 420*b*), that is, the differences between the inner diameters of the outer diameter-side rim portions 440*a* and 440*b* and the outer diameters of the inner diameter-side rim portions 460*a* and 460*b* may be arbitrarily set according to the size or the material (strength) of the retainer 20. Further, the radial positions (outer and inner diameters) of the passage portions 420*a* and 420*b*, that is, the inner diameters of the outer diameter-side rim portions 440*a* and 440*b* and the outer diameters of the inner diameter-side rim portions 460*a* and 460*b* may also be arbitrarily set according to the size or the material (strength) of the retainer 20.

Since the passage portions 420*a* and 420*b* are formed at the pair of rim portions 40*a* and 40*b* as described above, it is possible to draw a lubricant into the passage portions 420*a* and 420*b* and to temporarily store the drawn lubricant. Furthermore, it is possible to sufficiently supply a lubricant to the rollers, which are retained in the pockets 100, by making the lubricant easily flow into the pockets 100 from the passage portion of one rim portion (as an example, the passage portion 420*a* of the rim portion 40*a*) to the pocket 100, and to smoothly discharge the lubricant through the passage portion of the other rim portion (as an example, the passage portion 420*b* of the rim portion 40*b*). Accordingly, in the retainer 20, it is possible to secure an oil supply path from one passage portion (as an example, the passage portion 420*a*) to the other passage portion (as an example, the passage portion 420*b*) through the pockets 100, to increase the flowability (oil passing property) of a lubricant, and to improve lubrication performance.

Figure 10:
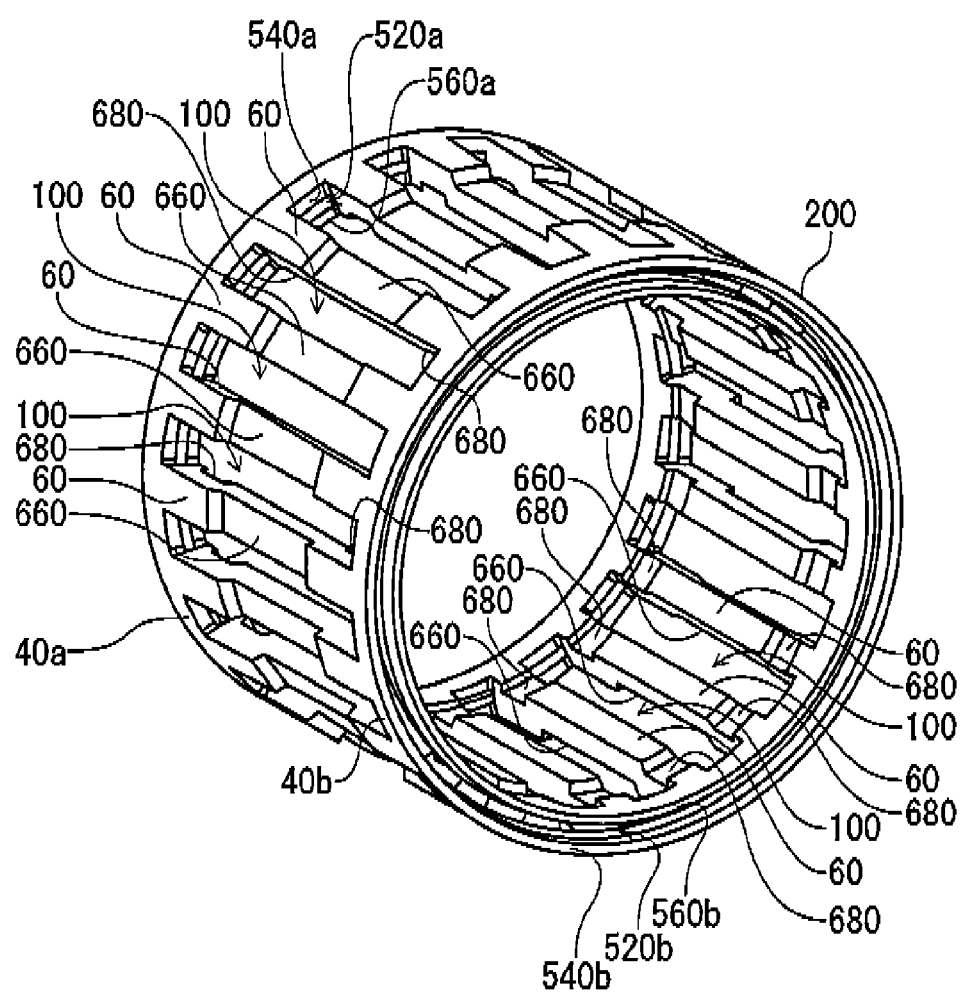
FIG. 10 is a perspective view showing the entire structure of a retainer for a radial roller bearing according to a second embodiment of the invention.

Meanwhile, FIG. 9 has shown the structure where the outer diameters (the inner diameters of the outer diameter-side rim portions 440*a* and 440*b*) and the inner diameters (the outer diameters of the inner diameter-side rim portions 460*a* and 460*b*) are set to diameters constant in the axial direction and the passage portions 420*a* and 420*b* (the inner peripheral portions of the outer diameter-side rim portions 440*a* and 440*b* and the outer peripheral portions of the inner diameter-side rim portions 460*a* and 460*b*) are formed in the shape of a cylinder that has constant inner and outer diameters in the axial direction (straight cylindrical shape). However, the structure of the passage portions is not limited to this cylindrical shape. For example, the passage portions may have a structure where the inner or outer diameters are set to different values at the outer and inner portions in the axial direction so that at least one of the outer and inner peripheral portions has a tapered shape or a convex curved shape. As an example, the structure of the passage portions, where all of the outer and inner diameters are set to different values on the outer and inner sides in the axial direction so that both the outer and inner peripheral portions have a tapered shape, is shown in FIG. 10 as a third embodiment of the invention. In this case, the same components as the components of the above-mentioned second embodiment (FIG. 9) or components similar to the components of the above-mentioned second embodiment are denoted by the same reference numerals.

In the third embodiment, a pair of rim portions 40*a* and 40*b* of a retainer 200 includes passage portions 520*a* and 520*b* of which both outer and inner peripheral portions are formed in a tapered shape, and has double annular structures where outer diameter-side rim portions 440*a* and 440*b* and inner diameter-side rim portions 460*a* and 460*b* are concentrically arranged with the passage portions 520*a* and 520*b* interposed therebetween, respectively. FIG. 10 shows the structure of the passage portions 520*a* and 520*b* of which the outer diameters (that is, the inner diameters of the outer diameter-side rim portions 440*a* and 440*b*) are set to different values on the outer and inner sides in the axial direction (as an example, a tapered shape where the diameter is gradually increased after being gradually reduced from the outer portion) and the inner diameters (that is, the outer diameters of the inner diameter-side rim portions 460*a* and 460*b*) are set to different values on the outer and inner sides in the axial direction (as an example, a tapered shape where the diameter is gradually reduced after being gradually increased from the outer portion). Since the passage portions 520*a* and 520*b* are formed in this tapered shape, it is possible to more easily draw a lubricant and to more easily discharge a lubricant. Accordingly, the flowability (oil passing property) of a lubricant is further increased, so that it is possible to further improve lubrication performance. Considering these operational effects, the passage portions 520*a* and 520*b* may be formed in a tapered shape or a convex curved shape. However, as long as it is possible to increase the flowability of a lubricant, the passage portions 520*a* and 520*b* may be formed to have a shape that is obtained from the combination of these shapes or other shapes (for example, a structure where spiral grooves are formed at the outer and inner peripheral portions of the passage portions 520*a* and 520*b* (the inner peripheral portions of the outer diameter-side rim portions 440*a* and 440*b* and the outer peripheral portions of the inner diameter-side rim portions 460*a* and 460*b*). It is also assumed that different passage portions are formed at both the rim portions 40*a* and 40*b* (for example, one rim portion 40*a* is formed in a tapered shape and the other rim portion 40*b* is formed in a convex curved shape).

Meanwhile, this embodiment is the same as the above-mentioned second embodiment (FIG. 9) in that the passage portions 520*a* and 520*b* continue in the circumferential direction, pass through the rim portions 40*a* and 40*b* from one side to the other side in the axial direction at portions having the same phases as the phases of the pockets 100 in the circumferential direction, and communicate with the pockets 100. Accordingly, likewise, the pocket 100 may communicate with the passage portions 520*a* and 520*b* over the entire width of the pocket 100 in the circumferential direction, and may communicate with the passage portions 520*a* and 520*b* at only a part of the width of the pocket in the circumferential direction. Further, the depths of the passage portions 520*a* and 520*b* in the axial direction may be adjusted so that the bottom portions (groove bottoms) of the passage portions 520*a* and 520*b* in the axial direction substantially correspond to the axial positions of the end portions of the pillar portions 60 in the axial direction at the portions having the same phases as the phases of the pillar portions 60 in the circumferential direction. However, this embodiment is the same as the above-mentioned second embodiment (FIG. 9) in that it may also be assumed that the bottom portions (groove bottoms) of the passage portions 520*a* and 520*b* are shallower than communication ports between the pocket 100 and the passage portions 520*a* and 520*b* (the end portions of the pillar portions 60 in the axial direction protrude further than the communication ports).

Furthermore, in this embodiment, reduced diameter portions 660 that are formed by recessing the outer diameter sides of the pillar portions in a concave shape so as to correspond to the rolling surfaces of the rollers, and increased diameter portions 680 that are formed by recessing the inner diameter sides of the pillar portions in a concave shape are formed at the pillar portions 60. In this case, the reduced diameter portion 660 is formed near the middle portion of the outer diameter side of each pillar portion 60 in the axial direction over the entire width of the pillar portion in the circumferential direction, and the increased diameter portions 680 are formed near both end portions of the inner diameter side of each pillar portion 60 in the axial direction over the entire width of the pillar portion in the circumferential direction. Accordingly, in this embodiment, the pillar portion 60 is formed so that the thickness of the pillar portion 60 in the radial direction is reduced by the thickness of the reduced diameter portion 660 and the increased diameter portion 680. That is, since the reduced diameter portions 660 and the increased diameter portions 680 are formed so as to correspond to the rolling surfaces of the rollers, that is, so as to correspond to the outer and inner raceways, it is possible to reduce the thickness of the pillar portions 60 along these outer and inner raceways. In other words, it is possible to easily store and discharge a lubricant along the outer and inner raceways, and to more reliably increase lubricity during the rolling of the rollers without stopping the supply of oil to the rolling surfaces of the rollers retained in the pockets 100.

The size and shape of the reduced diameter portion 660 and the increased diameter portion 680, the positions of the reduced diameter portion 660 and the increased diameter portion 680 formed at the pillar portion 60, and the like are not particularly limited and may be arbitrarily set. For example, a structure where reduced diameter portions are formed near both end portions of the outer diameter side of each pillar portion 60 in the axial direction and an increased diameter portion is formed near the middle portion of the inner diameter side of each pillar portion 60 in the axial direction, or a structure where a reduced diameter portion and an increased diameter portion are formed over at part of the width of each pillar portion 60 in the circumferential direction may also be assumed.

Further, the structure where the same reduced diameter portion 660 and the same increased diameter portions 680 are formed at the same positions on each pillar portion 60 has been shown in FIG. 10 as an example. However, for example, a structure where the same reduced diameter portion and the same increased diameter portions are formed only at a part of pillar portions 60, a structure where pillar portions including only reduced diameter portions and pillar portions including only increased diameter portions are mixed, a structure where a plurality of reduced diameter portions and increased diameter portions having different shapes are arbitrarily combined and formed at arbitrary pillar portions, or the like may also be assumed.

Meanwhile, in the above-mentioned second embodiment (FIG. 9), these reduced diameter portions and increased diameter portions (for example, the same reduced diameter portions 660 and increased diameter portions 680 (FIG. 10) as those of the third embodiment) may be formed at the pillar portions 60.

In both the above-mentioned second and third embodiments (FIGS. 9 and 10), the passage portions 420*a*, 420*b*, 520*a*, and 520*b* have been formed in the shape of a circular ring that continues in the circumferential direction (the respective rim portions 40*a* and 40*b* have had double annular structures where the outer diameter-side rim portions 440*a*, 440*b*, 540*a*, and 540*b* and the inner diameter-side rim portions 460*a*, 460*b*, 560*a*, and 560*b* are concentrically arranged). However, the passage portions may be disposed at predetermined intervals so as to be intermittent in the circumferential direction. The structure of a retainer 300, where passage portions are disposed at regular intervals so as to be intermittent in the circumferential direction as described above, is shown in FIG. 11 as a fourth embodiment of the invention. In this case, the same components as the components of the above-mentioned second and third embodiments (FIGS. 9 and 10) or components similar to the components of the above-mentioned second and third embodiments (FIGS. 9 and 10) are denoted by the same reference numerals.

In the fourth embodiment, passage portions 720*a* and 720*b* are intermittent in the circumferential direction, pass through the rim portions 40*a* and 40*b* from one side to the other side in the axial direction at portions having the same phases as the phases of the pockets 100 in the circumferential direction, and communicate with the pockets 100. That is, the passage portions 720*a* and 720*b* are formed of through holes which are formed at the rim portions 40*a* and 40*b* at regular intervals in the circumferential direction so as to correspond to the pockets 100 and of which the number is equal to the number of the pockets 100. Meanwhile, in this case, each pocket 100 may communicate with the passage portions 720*a* and 720*b* over the entire width of the pocket 100 in the circumferential direction, and may communicate with the passage portions 720*a* and 720*b* only at a part of the width of the pocket in the circumferential direction.

Since the passage portions 720*a* and 720*b* are intermittent in the circumferential direction as described above, it is possible to increase the strength of the rim portions 40*a* and 40*b* themselves as compared to the case where the passage portions continue in the circumferential direction (for example, the above-mentioned second embodiment (FIG. 9), the above-mentioned third embodiment (FIG. 10), or the like). Accordingly, the retainer has superiority in terms of the use where a retainer requires larger strength.

Figure 11:
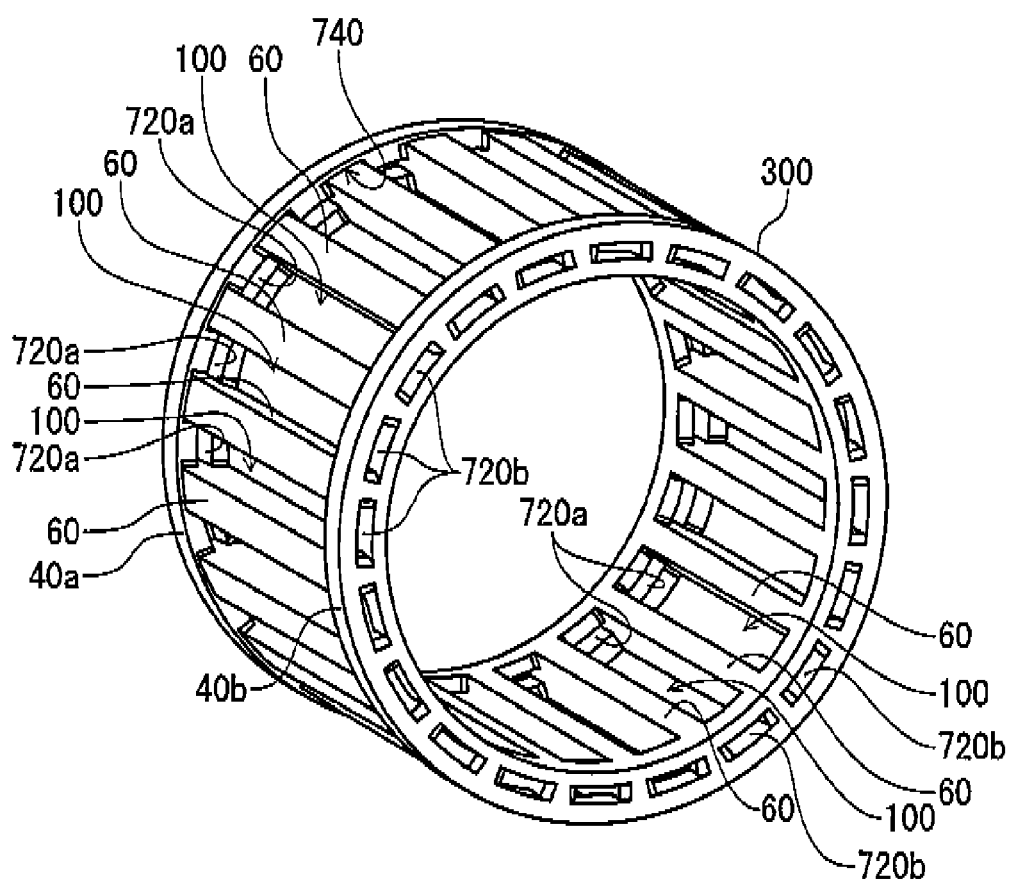
FIG. 11 is a perspective view showing the entire structure of a retainer for a radial roller bearing according to a third embodiment of the invention.

The structure of the passage portions 720*a* and 720*b*, which are disposed at regular intervals smaller than the interval of the pockets 100 (that is, the width of the pillar portion in the circumferential direction), is shown in FIG. 11 as an example. In this case, the passage portions 720*a* and 720*b* are formed in a convex curved shape (so-called rounded shape) where both the inner surfaces of in the circumferential direction gradually approach from outer openings in the axial direction (the openings opposite to the portions communicating with the pockets 100) until the interval between the passage portions becomes the width of the pocket 100 in the circumferential direction. Accordingly, even when the passage portions 720*a* and 720*b* are disposed intermittently as in this embodiment, it is possible to more easily draw a lubricant and to more easily discharge a lubricant. Meanwhile, the portions near the outer openings in the axial direction may be formed not in the convex curved shape (rounded shape) but in the tapered shape in the circumferential direction. Further, the portions near the outer openings in the axial direction may be formed not in a convex curved shape (rounded shape) or a tapered shape but in a straight shape. However, considering the drawing property and the discharging property of a lubricant, it is preferable that the portions near the outer openings in the axial direction be formed in a convex curved shape (rounded shape) or a tapered shape in the circumferential direction.

The size, the shape, the number, and the like of the passage portions 720a and 720b, which are through holes, are not particularly limited and may be arbitrarily set according to the size or the material (strength) of the retainer 300. For example, a structure, where passage portions are disposed (formed) at the rim portions 40a and 40b at regular intervals in the circumferential direction so as to correspond to a plurality of adjacent pockets 100 (as an example, over the area corresponding to two adjacent pockets 100 in the circumferential direction), or the like may also be assumed.

Furthermore, the structure of the retainer 300 where the same passage portions 720a and 720b are disposed at all of the pair of rim portions 40a and 40b has been shown in FIG. 11 as an example. For example, the structure where passage portions having different shapes are formed at both the rim portions 40a and 40b or passage portions having plural different shapes are combined and disposed at each of the rim portions 40a and 40b may also be assumed.

Meanwhile, in this embodiment, the outer diameters of the pair of rim portions 40a and 40b are set to be larger than the outer diameter of the pillar portions 60. That is, the retainer 300 has a structure where the pair of rim portions 40a and 40b protrudes further than the pillar portions 60 in the radial direction over the entire circumference at the both end portions of the pillar portions 60 in the axial direction, so that a step 740 is formed. Meanwhile, a difference between the outer diameter of each of the pair of rim portions 40a and 40b and the outer diameter of the pillar portions 60 (that is, corresponding to the height of the step 740) may be arbitrarily set according to the size of the retainer 300, the diameter of the roller, or the like.

Since the outer diameters of the pair of rim portions 40a and 40b are set to be larger than the outer diameter of the pillar portions 60 as described above, it is possible to obtain the same effect (as the effect of the above-mentioned third embodiment (FIG. 10)) when the pillar portions 60 are formed to be thin along the rolling surfaces of the rollers (that is, the outer and inner raceways). That is, since the pillar portions 60 can be formed at the pair of rim portions 40a and 40b so as to be recessed in the radial direction, it is possible to easily store and discharge a lubricant along the outer and inner raceways and to more reliably increase lubricity during the rolling of the rollers without stopping the supply of oil to the rolling surfaces of the rollers retained in the pockets 100.

Here, in the above-mentioned second to fourth embodiments (FIGS. 9 to 11), the retainers 20, 200, and 300 have been formed so that each of the pair of rim portions 40a and 40b is formed in the shape of a series of substantially circular ring. However, a retainer may have a structure where each of a pair of rim portions is formed in the shape of a discontinuous segmental circular ring (in a substantially C shape) so as to have one cutout portion. Even though a retainer has this structure, it is possible to obtain the same operational effects as the operational effects of the above-mentioned respective embodiments (FIGS. 9 to 11).

Figure 12:
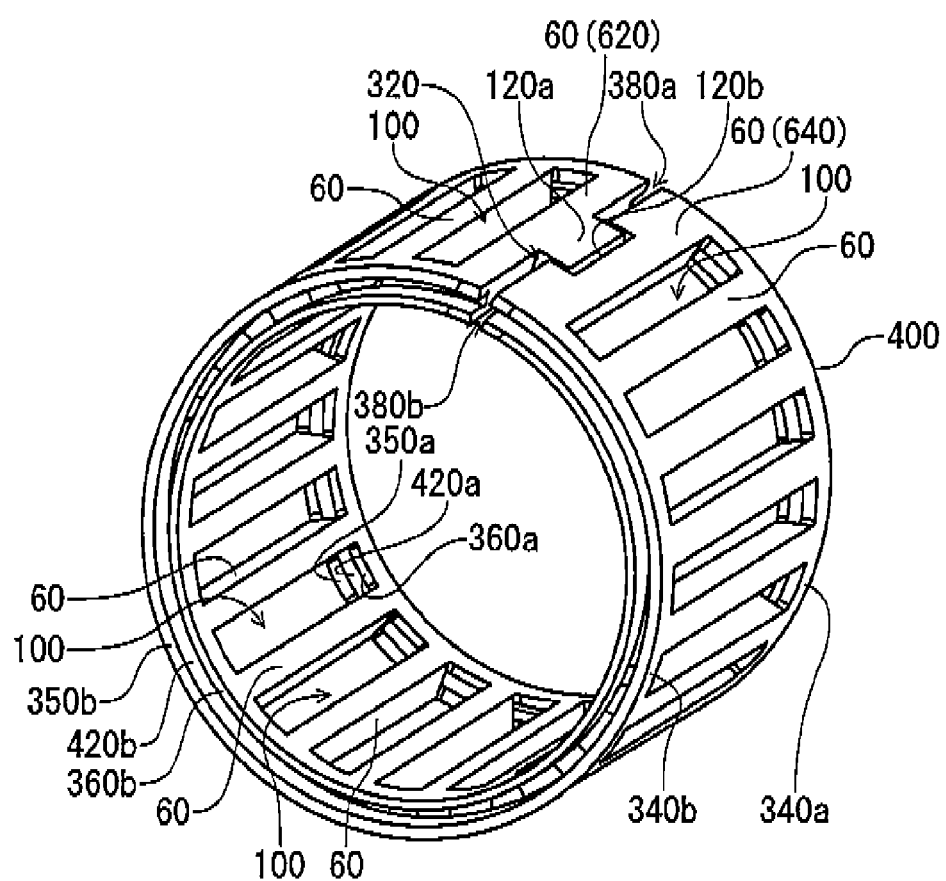
FIG. 12 is a perspective view showing the entire structure of a retainer for a radial roller bearing according to a fourth embodiment of the invention.
Figure 13:
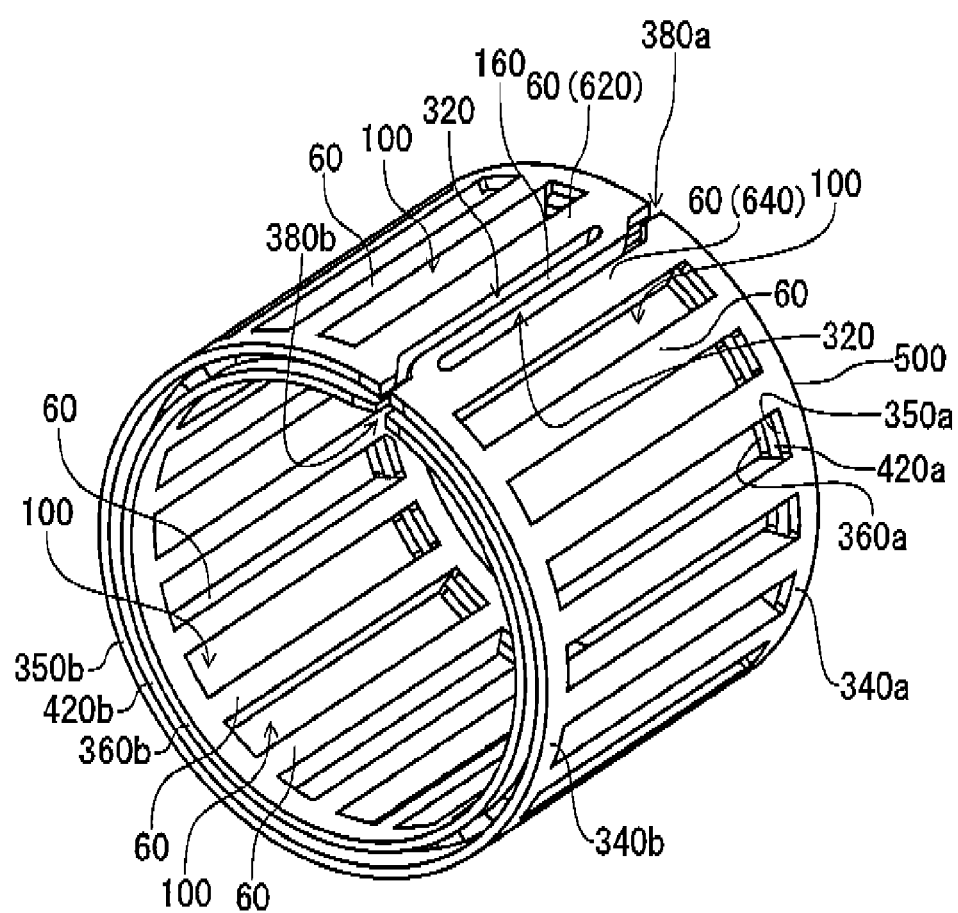
FIG. 13 is a perspective view showing the entire structure of a retainer for a radial roller bearing according to a fifth embodiment of the invention.

Examples of the structure of a retainer where each of a pair of rim portions is formed in the shape of a discontinuous segmental circular ring (in a substantially C shape) so as to have one cutout portion are shown in FIGS. 12 and 13, respectively.

Hereinafter, the structure of the retainer shown in FIG. 12 will be described below as a fifth embodiment and the structure of the retainer shown in FIG. 13 will be described below as a sixth embodiment. Meanwhile, in the retainers according to these fifth and sixth embodiments (FIGS. 12 and 13), each of the pair of rim portions has been formed in the shape of a discontinuous segmental circular ring (in a substantially C shape) so as to have one cutout portion. However, each of the retainers has a structure where passage portions are disposed at the pair of rim portions, and the basic structure of the retainers is common to the retainer 20 according to the above-mentioned second embodiment (FIG. 9). Accordingly, the same members as the members of the above-mentioned second embodiment or members similar to the members of the above-mentioned second embodiment will be denoted by the same reference numerals in the drawings and the description thereof will be omitted or simplified. Only the characteristic structure of the respective embodiments (FIGS. 12 and 13) will be described in detail.

The structure of a retainer 400 according to the fifth embodiment is shown in FIG. 12. A pair of rim portions 340a and 340b is formed in the shape of a discontinuous segmental circular ring (in a substantially C shape) so as to have cutout portions 380a and 380b, respectively. The cutout portions 380a and 380b of the respective rim portions 340a and 340b are concentrically disposed so as to face each other with a predetermined interval therebetween in an axial direction (a horizontal direction of FIG. 2A) while having the same phase in the circumferential direction (while the positions of the cutout portions 380a and 380b in the circumferential direction correspond to each other). That is, the retainer 400 has a substantially cylindrical appearance shape that includes one split portion 320 in the circumferential direction (so-called one-split retainer structure). In this case, the diameter of each of the rim portions 340a and 340b or the interval between the rim portions 340a and 340b facing each other in the axial direction may be arbitrarily set according to the size and the like of the bearing.

Meanwhile, this embodiment is the same as the above-mentioned second embodiment (FIG. 9) in that the pair of rim portions 340a and 340b includes the passage portions 420a and 420b that are formed in the shape of a cylinder having constant inner and outer diameters in the axial direction and the rim portions 340a and 340b have double annular structures where outer diameter-side rim portions 350a and 350b and inner diameter-side rim portions 360a and 360b are concentrically arranged with the passage portions 420a and 420 interposed therebetween, respectively. In this case, this embodiment is also the same as the above-mentioned second embodiment (FIG. 9) in that the passage portions 420a and 420b continue in the circumferential direction, pass through the rim portions 340a and 340b from one side to the other side in the axial direction at portions having the same phases as the phases of the pockets 100 in the circumferential direction, and communicate with the pockets 100. Accordingly, the pocket 100 may communicate with the passage portions 420a and 420b over the entire width of the pocket 100 in the circumferential direction, and may communicate with the passage portions 420a and 420b at only a part of the width of the pocket in the circumferential direction. Further, the depths of the passage portions 420a and 420b in the axial direction may be adjusted so that the bottom portions (groove bottoms) of the passage portions 420a and 420b in the axial direction substantially correspond to the axial positions of the end portions of the pillar portions 60 in the axial direction at the portions having the same phases as the phases of the pillar portions 60 in the circumferential direction. However, it may also be assumed that the bottom portions (groove bottoms) of the passage portions 420a and 420b are shallower than communication ports between the pocket 100 and the passage portions 420a and 420b (the end portions of the pillar portions 60 in the axial direction protrude further than the communication ports).

Furthermore, the passage portions may be formed as in the above-mentioned third embodiment (FIG. 10) and both (or one of) the outer and inner peripheral portions of the pair of rim portions 340a and 340b may be formed in a tapered shape or a convex curved shape. Alternatively, the passage portions may be disposed at predetermined intervals so as to be intermittent in the circumferential direction as in the above-mentioned fourth embodiment (FIG. 11). Meanwhile, in any case, reduced diameter portions and increased diameter portions (for example, the same reduced diameter portions 660 and increased diameter portions 680 (FIG. 10) as those of the third embodiment) may be formed at the pillar portions 60 and a step (for example, the same step 740 (FIG. 11) as the step of the fourth embodiment) may be formed between the pair of rim portions 340a and 340b and the pillar portion 60.

The plurality of pillar portions 60 connect the pair of rim portions 340a and 340b in the axial direction and form pockets 100 where rolling bodies, that is, rollers (needles) (not shown) are inserted and rotatably retained, by separating the area between the rim portions 340a and 340b into areas in the circumferential direction of the rim portions 430a and 340b. That is, the retainer 400 has a structure where one pocket 100 is formed in the space surrounded by two pillar portions 60, which are adjacent to each other in the circumferential direction, and the pair of rim portions 340a and 340b and the pillar portions 60 and the pockets 100 are alternately disposed in the circumferential direction. However, the split portion 320 is present and the pocket 100 is not formed in the area between the rim portions 340a and 340b that is separated by two pillar portions 60 disposed close to both sides of the cutout portions 380a and 380b of the respective rim portions 340a and 340b in the circumferential direction (hereinafter, referred to as cutout portion-adjacent pillar portions 620 and 640). Accordingly, the retainer 400 has a structure where a roller is not provided in the area (that is, the split portion 320), that is, a structure where the rollers are inserted into the respective pockets 100 except for the above-mentioned area one by one and these rollers are disposed in the circumferential direction at regular intervals (the same pitch).

Meanwhile, the size of each of the pockets 100 formed by the pillar portions 60 may be set according to the diameter and length of the roller so that the rollers can be rotatably retained in the pockets 100. The number of the pockets 100 (that is, the number of the pillar portions 60) may be arbitrarily set so as to correspond to the capacity (the number of the retained rollers) of the retainer 400 (this is the same as the above-mentioned second embodiment (FIG. 9)).

As described above, the cutout portions 380a and 380b are formed at the pair of rim portions 340a and 340b, respectively, and the retainer 400 has a structure that includes one split portion 320 in the circumferential direction (so-called one-split retainer structure). Accordingly, when a force is applied to the retainer 400 in a direction where the size of the split portion 320 is increased, that is, in a direction where both end faces of the respective rim portions 340a and 340b in the circumferential direction (the surfaces of the cutout portions 380a and 380b facing each other) are separated from each other, the entire retainer 400 is elastically deformed. As a result, it is possible to increase the size of the split portion 320 (the cutout portions 380a and 380b), that is, to increase the diameter of the retainer 400 (clearly, the rim portions 340a and 340b). Further, when a force is applied from this state in a direction where the size of the split portion 320 is reduced, that is, in a direction where both end faces of the respective rim portions 340a and 340b in the circumferential direction (the surfaces of the cutout portions 380a and 380b facing each other) approach each other, the entire retainer 400 is elastically deformed to an original state where the size of the split portion 320 is not yet increased. As a result, it is possible to make the retainer return to the original state by reducing the size of the split portion 320 (the cutout portions 380a and 380b), that is, to make the diameter of the retainer 400 return to the original diameter (the diameter of the retainer that is not yet increased) by reducing the diameter of the retainer 400 (clearly, the rim portions 340a and 340b). Meanwhile, the following structure of a retainer may also be assumed. This structure of a retainer returns to the original diameter (the diameter of the retainer that is not yet increased) by reducing the diameter of the retainer 400 without applying a force to the retainer 400 in a direction, where the size of the split portion 320 is reduced, with only the elastic restoring force of the retainer 400 itself that is generated by the removal of a force applied in a direction where the size of the split portion 320 is increased, or while adding the force, which is applied in the direction where the size of the split portion is reduced, to the elastic restoring force.

Accordingly, it is possible to freely increase and reduce the diameter of the retainer 400, and to easily assemble the retainer 400 with an inner member or the like that includes stepped portions, collar portions, or the like having various sizes. For example, even when the retainer 400 is assembled with an inner raceway portion of a rotating shaft that includes stepped portions, flange-shaped collar portions, or the like having an outer diameter set to be larger than the inner diameter of the retainer and protruding from the outer peripheral surface of the shaft, the size of the split portion 320 of the retainer 400 is increased (the diameter of the retainer 400 is increased). Accordingly, it is possible to smoothly move the retainer 400 to the inner raceway portion of the rotating shaft in the axial direction without the interference between the retainer and the stepped portions or the collar portions.

After the retainer 400 is assembled with the above-mentioned rotating shaft, it is necessary to prevent the occurrence of the separation or positional deviation of the retainer 400 that is caused by the re-increase of the size of the split portion 320 (the cutout portions 380a and 380b) of the retainer 400. For this purpose, the retainer 400 is provided with a locking mechanism that prevents the above-mentioned situation. That is, the locking mechanism can maintain the diameters of the rim portions 340a and 340b constant and keep the retainer 400 at a normal diameter by preventing the sizes of the cutout portions 380a and 380b from being increased (clearly, being increased again).

The structure of the retainer 400, which includes a convex portion 120a and a concave portion 120b fitted to each other as the locking mechanism, is exemplified in FIG. 12. In this case, the convex portion 120a is formed at one (as an example, the cutout portion-adjacent pillar portion 620) of the cutout portion-adjacent pillar portions 620 and 640, which are adjacent to each other in the circumferential direction with the split portion 320 interposed therebetween and are disposed so as to face each other, and the concave portion 120b is formed at the other thereof (as an example, the cutout portion-adjacent pillar portion 640). The convex portion 120a protrudes from the surface of the cutout portion-adjacent pillar portion 620, which faces the cutout portion-adjacent pillar portion 640, in the circumferential direction so as to have a predetermined shape and size (length). The concave portion 120b is formed by cutting a portion of the cutout portion-adjacent pillar portion 640, which faces the cutout portion-adjacent pillar portion 620, into a predetermined shape and size (the depth in the circumferential direction) from the inner diameter side to the outer diameter side so that the convex portion 120a can be fitted to the concave portion. Meanwhile, as long as the convex portion 120a and the concave portion 120b can be fitted to each other, the shapes, sizes (lengths and depths), and the like of the convex portion and the concave portion are not particularly limited and may be arbitrarily set according to the material, size (diameter or width), or the like of the retainer 400. Further, as long as the locking mechanism can prevent the re-increase of the size of the split portion 320 (the cutout portions 380a and 380b) of the retainer 400, the locking mechanism is not limited to the mechanism, such as the convex portion 120a and concave portion 120b capable of being fitted to each other, and may be appropriately changed to various known mechanisms.

For example, the locking mechanism may have a structure where first convex portions protrude from one side in the circumferential direction with the split portion 320 (the cutout portions 380a and 380b) interposed therebetween and are fitted to first concave portions formed on the other side, and second convex portions protrude from the other side in the circumferential direction with the split portion 320 (the cutout portions 380a and 380b) interposed therebetween and are fitted to second concave portion formed on one side (are alternately fitted to the second concave portion in the axial direction (even though being offset)); a structure where portions of the retainer overlap each other in the radial direction; or the like.

Meanwhile, an expandable elastic connecting portion may be formed at the pair of rim portions 340a and 340b. This expandable elastic connecting portion connects one end portion of both end portions of one rim portion in the circumferential direction, which face each other with the cutout portions 380a and 380b interposed therebetween, to the end portion, which is formed on the side opposite to the one end portion in the circumferential direction, of both end portions of the other rim portion in the circumferential direction, which face each other with the cutout portions 380a and 380b interposed therebetween. Alternatively, an expandable elastic connecting portion may be formed. This expandable elastic connecting portion connects one end portion of both end portions of the one rim portion in the circumferential direction, which face each other with the cutout portions 380a and 380b interposed therebetween, to the end portion, which is formed on the same side as the one end portion in the circumferential direction, of both end portions of the other rim portion in the circumferential direction, which face each other with the cutout portions 380a and 380b interposed therebetween. In this case, the elastic connecting portion may be formed at the retainer, instead of the locking mechanism (the convex portion 120a and the concave portion 120b) of the above-mentioned fifth embodiment (FIG. 12).

The example of the structure of a retainer 500, which is provided with this elastic connecting portion, is shown in FIG. 13, and the example of the structure shown in FIG. 13 will be described below as a sixth embodiment of the invention. Meanwhile, in the sixth embodiment (FIG. 13), the elastic connecting portion is provided instead of the locking mechanism. However, the structure except for this is the same as the structure of the above-mentioned fifth embodiment (FIG. 12) (the same components as the components of the fifth embodiment or components similar to the components of the fifth embodiment will be denoted by the same reference numeral in the drawing).

In the sixth embodiment, an expandable elastic connecting portion 160 is formed at a pair of rim portions 340a and 340b as shown in FIG. 13. This expandable elastic connecting portion 160 connects one end portion of both end portions of one rim portion (as an example, the rim portion 340a) in the circumferential direction, which face each other with the cutout portion 380a interposed therebetween, to the other end portion of both end portions of the other rim portion (as an example, the rim portion 340b) in the circumferential direction, which face each other with the cutout portion 380b interposed therebetween.

Specifically, the elastic connecting portion 160 connects one end portion of both end portions of the rim portion 340a in the circumferential direction, which face each other with the cutout portion 380a interposed therebetween, to the other end portion of both end portions of the rim portion 340b in the circumferential direction, which face each other with the cutout portion 380b interposed therebetween. That is, the elastic connecting portion 160 is formed across the split portion 320 from a connection portion between the cutout portion-adjacent pillar portion 620 and the rim portion 340a (a root portion of the cutout portion-adjacent pillar portion 620 close to the rim portion 340a) to a connection portion between the cutout portion-adjacent pillar portion 640 and the rim portion 340b (a root portion of the cutout portion-adjacent pillar portion 640 close to the rim portion 340b). Accordingly, the elastic connecting portion 160 divides the split portion 320 into two portions (see FIG. 13). However, the elastic connecting portion may be formed across the split portion 320 in a reverse direction of FIG. 13 (the elastic connecting portion may be formed across the split portion 320 from a connection portion between the cutout portion-adjacent pillar portion 620 and the rim portion 340b (a root portion of the cutout portion-adjacent pillar portion 620 close to the rim portion 340b) to a connection portion between the cutout portion-adjacent pillar portion 640 and the rim portion 340a (a root portion of the cutout portion-adjacent pillar portion 640 close to the rim portion 340a).

As described above, the rim portions 340a and 340b are connected to each other by the elastic connecting portion 160. Accordingly, when a force is applied to the retainer 500 in a direction where the size of the split portion 320 (clearly, the cutout portions 380a and 380b of the rim portions 340a and 340b) is increased, the elastic connecting portion 160 is elastically deformed to both sides in the circumferential direction (in the direction where the size of the split portion 320 is increased). Accordingly, the elastic connecting portion 160 is stretched. As a result, it is possible to increase the size of the split portion 320 (the cutout portions 380a and 380b), that is, to increase the diameter of the retainer 500. Further, when a force is applied to the retainer 500 in a direction where the size of the split portion 320 (clearly, the cutout portions 380a and 380b of the rim portions 340a and 340b) is reduced, the elastic connecting portion 160 is elastically deformed and stretched in a direction opposite to the direction at the time of the increase of the size of the split portion 320. Accordingly, the split portion 320 is crushed. As a result, it is possible to reduce the size of the split portion 320 (the cutout portions 380a and 380b), that is, to reduce the diameter of the retainer 500.

Furthermore, when a predetermined force applied to the retainer 500 (a force applied in the direction where the size of the split portion 320 (the cutout portions 380a and 380b) is increased or reduced) is removed, the elastic connecting portion 160 can return to the original state by an elastic restoring force. Accordingly, the split portion 320 (the cutout portions 380a and 380b) of the retainer 500, that is, the diameter of the retainer 500 can return to the original state. Meanwhile, since the diameter of the retainer 500 is increased within the limit of the stretched length of the elastic connecting portion 160, the diameter of the retainer 500 is not excessively increased in excess of the limit. Since the diameter of the retainer is reduced within the range until both end portions of the pair of rim portions 340a and 340b in the circumferential direction, which face each other with the cutout portions 380a and 380b interposed therebetween, come into contact with each other, the diameter of the retainer is not excessively reduced in excess of the contact range.

As described above, the elastic connecting portion 160 freely increase and reduce the diameter of the retainer 500 within a predetermined range by the function of a so-called spring (so-called retainer structure with a spring). Accordingly, for example, a bearing where the retainer 500 is assembled is rotated integrally with a gear, and the size of the retainer 500 is increased in the radial direction (the diameter of the retainer 500 is increased) by a centrifugal force generated at that time. Meanwhile, the retainer 500 smoothly returns to the original state (the diameter of the retainer 500 is reduced) at the time of low speed rotation (at the time of deceleration). Therefore, it is possible to change and adjust a contact position between the pocket surface and the peripheral surface (rolling surface) of the roller and to effectively prevent damage such as fretting from being generated on the retainer 500. Further, even when a very large load (for example, a radial load) is applied to a bearing where the retainer 500 is assembled, the diameter of the retainer 500 is flexibly increased or reduced, so that the contact position between the pocket surface and the peripheral surface of the roller is changed and adjusted and it is possible to efficiently release a load. Accordingly, it is possible to improve the durability (as an example, fretting resistance) of the retainer 500.

Meanwhile, like the locking mechanism according to the above-mentioned fifth embodiment (FIG. 12), the elastic connecting portion may have a structure where portions of the retainer overlap each other in the radial direction, for example, a double structure where portions of the retainer cross each other on the outer diameter side and the inner diameter side (as an example, an across double spring structure).

In the retainer according to the invention, each of the pair of rim portions may have a structure where a plurality of substantially circular arc-shaped divided bodies is assembled in the shape of a substantially circular ring (in the shape of a discontinuous segmental ring).

Figure 14:
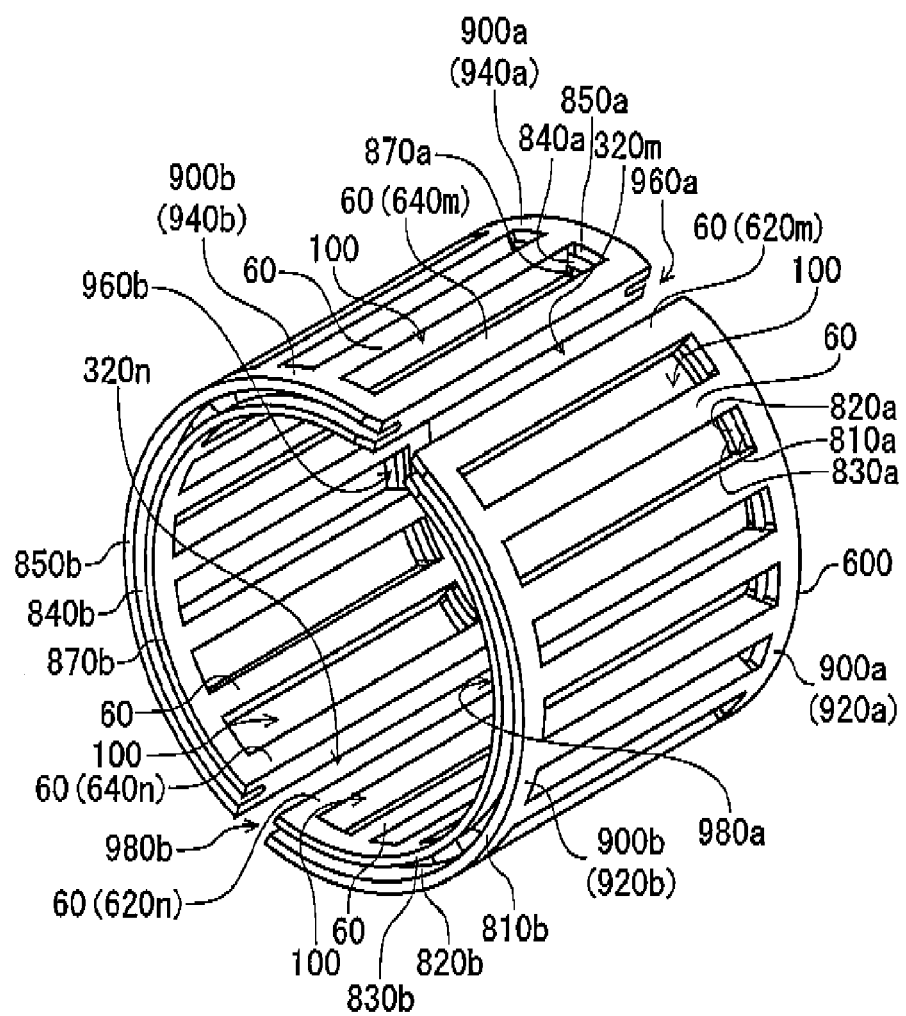
FIG. 14 is a perspective view showing the entire structure of a retainer for a radial roller bearing according to a sixth embodiment of the invention.

The structure of a retainer 600 according to a seventh embodiment of the invention is shown in FIG. 14. In this case, the retainer 600 has a two-divided structure where all of a pair of rim portions 900a and 900b is formed of two substantially circular arc-shaped divided bodies 920a and 940a and 920b and 940b, respectively. Meanwhile, the retainer 600 according to this embodiment has a structure where a passage portion is formed at each of the pair of rim portions 900a and 900b, more specifically, the divided bodies 920a, 940a, 920b, and 940b. The basic structure of the retainer is common to the retainer 20 according to the above-mentioned second embodiment (FIG. 9) (the same members as the members of the above-mentioned second embodiment or members similar to the members of the above-mentioned second embodiment will be denoted by the same reference numerals in the drawing).

As shown in FIG. 14, the retainer has a two-divided structure where all of the pair of rim portions 900a and 900b is formed of two substantially circular arc-shaped divided bodies 920a and 940a and 920b and 940b, respectively. Cutout portions 960a, 980a, 960b, and 980b of the respective rim portions 900a and 900b (the respective divided bodies 920a, 940a, 920b, and 940b) are concentrically disposed so as to face each other with a predetermined interval therebetween in an axial direction while having the same phase in the circumferential direction (while the positions of the cutout portions 960a and 960b in the circumferential direction correspond to the positions of the cutout portions 980a and 980b in the circumferential direction). That is, the retainer 900 has a substantially cylindrical appearance that includes two split portions 320m and 320n in the circumferential direction (so-called two-split retainer structure). In this case, the diameter of each of the rim portion 900a (the divided bodies 920a and 940a) and the rim portion 900b (the divided bodies 920b and 940b) or the interval between the rim portions 900a and 900b facing each other in the axial direction may be arbitrarily set according to the size and the like of the bearing.

In the seventh embodiment, the respective divided bodies 920a and 940a include passage portions 820a and 840a that are formed substantially in the shape of a semicylinder having constant inner and outer diameters in the axial direction. Accordingly, the rim portion 900a, which is formed by the combination of these divided bodies 920a and 940a, has a double substantially-annular structure where outer diameter-side rim portions 810a and 850a and inner diameter-side rim portions 830a and 870a are concentrically arranged with the passage portions 820a and 840a interposed therebetween. Likewise, the respective divided bodies 920b and 940b include passage portions 820b and 840b that are formed substantially in the shape of a semicylinder having constant inner and outer diameters in the axial direction. Accordingly, the rim portion 900b, which is formed by the combination of these divided bodies 920b and 940b, has a double substantially-annular structure where outer diameter-side rim portions 810b and 850b and inner diameter-side rim portions 830b and 870b are concentrically arranged with the passage portions 820b and 840b interposed therebetween. In this case, this embodiment is the same as the above-mentioned second embodiment (FIG. 9) in that the passage portions 820a, 840a, 820b, and 840b continue in the circumferential direction, pass through the rim portions 900a and 900b (the respective divided bodies 920a, 940a, 920b, and 940b) from one side to the other side in the axial direction at portions having the same phases as the phases of the pockets 100 in the circumferential direction, and communicate with the pockets 100. Accordingly, the pocket 100 may communicate with the passage portions 820a, 840a, 820b, and 840b over the entire width of the pocket 100 in the circumferential direction, and may communicate with the passage portions 820a, 840a, 820b, and 840b at only a part of the width of the pocket in the circumferential direction. Further, the depths of the passage portions 820a, 840a, 820b, and 840b in the axial direction may be adjusted so that the bottom portions (groove bottoms) of the passage portions 820a, 840a, 820b, and 840b in the axial direction substantially correspond to the axial positions of the end portions of the pillar portions 60 in the axial direction at the portions having the same phases as the phases of the pillar portions 60 in the circumferential direction. However, it may also be assumed that the bottom portions (groove bottoms) of the passage portions 420a and 420b are shallower than communication ports between the pocket 100 and the passage portions 820a, 840a, 820b, and 840b (the end portions of the pillar portions 60 in the axial direction protrude further than the communication ports).

Furthermore, the passage portions may be formed as in the above-mentioned third embodiment (FIG. 10) and both (or one of) the outer and inner peripheral portions of the pair of rim portions 900a and 900b (the respective divided bodies 920a, 940a, 920b, and 940b) may be formed in a tapered shape or a convex curved shape. Alternatively, the passage portions may be disposed at predetermined intervals so as to be intermittent in the circumferential direction as in the above-mentioned fourth embodiment (FIG. 11). Meanwhile, in any case, reduced diameter portions and increased diameter portions (for example, the same reduced diameter portions 660 and increased diameter portions 680 (FIG. 10) as those of the third embodiment) may be formed at the pillar portions 60 and a step (for example, the same step 740 (FIG. 11) as the step of the fourth embodiment) may be formed between the pair of rim portions 340a and 340b and the pillar portion 60.

The plurality of pillar portions 60 connect the pair of rim portions 900a and 900b (the respective divided bodies 920a, 940a, 920b, and 940b) in the axial direction and form pockets 100 where rolling bodies, that is, rollers (needles) (not shown) are inserted and rotatably retained, by separating the area between the rim portions 900a and 900b into areas in the circumferential direction of the rim portions 900a and 900b. That is, the retainer 600 has a structure where one pocket 100 is formed in the space surrounded by two pillar portions 60, which are adjacent to each other in the circumferential direction, and the pair of rim portions 900a and 900b (the respective divided bodies 920a, 940a, 920b, and 940b) and the pillar portions 60 and the pockets 100 are alternately disposed in the circumferential direction. However, the split portions 320m and 320n are present and the pocket 100 is not formed in the areas between the rim portions 900a and 900b (between the divided bodies 920a and 940a and between the divided bodies 920b and 940b) that is separated by four pillar portions 60 disposed close to both sides of the cutout portions 960a, 980a, 960b, and 980b of the respective rim portions 900a and 900b in the circumferential direction (hereinafter, referred to as cutout portion-adjacent pillar portions 620m, 640m, 620n, and 640n). Accordingly, the retainer 600 has a structure where rollers are not provided in the areas (that is, the split portions 320m and 320n), that is, a structure where the rollers are inserted into the respective pockets 100 except for the above-mentioned areas one by one and these rollers are disposed in the circumferential direction at regular intervals (the same pitch).

Meanwhile, the size of each of the pockets 100 formed by the pillar portions 60 may be set according to the diameter and length of the roller so that the rollers can be rotatably retained in the pockets 100. The number of the pockets 100 (that is, the number of the pillar portions 60) may be arbitrarily set so as to correspond to the capacity (the number of the retained rollers) of the retainer 600 (this is the same as the above-mentioned second embodiment (FIG. 9)).

As described above, two cutout portions 960a and 980a and 960b and 980b are formed at the pair of rim portions 900a and 900b (the respective divided bodies 920a, 940a, 920b, and 940b), respectively, and the retainer 600 has a structure that includes two split portions 320m and 320n in the circumferential direction (so-called two-split retainer structure). Accordingly, this embodiment is the same as the above-mentioned fifth and sixth embodiments (FIGS. 12 and 13) in that it is possible to freely increase and reduce the diameter of the retainer 600 and to easily assemble the retainer 600 with an inner member or the like that includes stepped portions, collar portions, or the like having various sizes.

As described above, according to the second to seventh embodiments of the invention (FIGS. 9 to 14), even when a guide portion, which guides the end face of a retainer, of a mating member where a bearing is assembled is not sufficiently secured, it is possible to make all of the outer and inner diameter sides of both end faces in the axial direction (that is, the pair of rim portions 40a and 40b, 340a and 340b, or 900a and 900b) come into contact with the guide portion of the mating member as a continuous surface without restriction in a direction where the bearing (clearly, the retainer 20, 200, 300, 400, 500, or 600) is assembled with the mating member while improving lubrication performance. As a result, it is possible to obtain retainers 20, 200, 300, 400, 500, and 600 for a radial roller bearing that can rotate and guide a bearing in an area larger than the area of discontinuous surfaces in the related art and thus has excellent abrasion resistance.

The invention has been described in detail or with reference to specific embodiments. However, it is apparent to those skilled in the art that the invention may be changed or modified without departing from the sprit and scope of the invention.

The invention claimed is:

1. A retainer for a radial roller bearing, comprising:
a first rim portion;
a second rim portion facing the first rim portion; and
a plurality of pillar portions that are provided between the first and second rim portions and connect the first and second rim portions,
wherein the first rim portion includes a first cutout portion and is formed in the shape of a discontinuous circular ring,
the second rim portion includes a second cutout portion and is formed in the shape of a discontinuous circular ring,
the first and second cutout portions are overlapped with each other in an axial direction,
respective adjacent ones of the pillar portions form a pocket in which a rolling body is rotatably retained,
the first rim portion includes a first end portion and a second end portion facing the first end portion with the first cutout portion interposed therebetween,
the second rim portion includes a first end portion and a second end portion facing the first end portion with the second cutout portion interposed therebetween,
an expandable elastic connecting portion, which connects the first end portion of the first rim portion to the second end portion of the second rim portion, is provided between the first and second rim portions,
a convex portion, which protrudes toward the first end portion of the first rim portion, is formed at the second end portion of the first rim portion, and a concave portion is formed at the first end portion of the first rim portion so as to face the convex portion, and
a convex portion, which protrudes toward the second end portion of the second rim portion, is formed at the first end portion of the second rim portion, and a concave portion is formed at the second end portion of the second rim portion so as to face the convex portion.

2. The retainer according to claim 1,
wherein the first and second cutout portions are formed at a middle position of a clearance between two pillar portions, which are disposed on both sides of the first and second cutout portions, in a circumferential direction.

* * * * *